US012719558B2

(12) United States Patent
Wang et al.

(10) Patent No.: US 12,719,558 B2
(45) Date of Patent: Aug. 25, 2026

(54) USING SOUNDING REFERENCE SIGNALS (SRS) FOR REPEATER DOWNLINK CHANNEL SOUNDING

(71) Applicant: QUALCOMM Incorporated, San Diego, CA (US)

(72) Inventors: Hua Wang, Basking Ridge, NJ (US); Arumugam Chendamarai Kannan, San Diego, CA (US); Divyansh Karemore, San Diego, CA (US); Navid Abedini, Basking Ridge, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 18/395,008

(22) Filed: Dec. 22, 2023

(65) Prior Publication Data

US 2025/0211321 A1 Jun. 26, 2025

(51) Int. Cl.
*H04B 7/155* (2006.01)
*H04L 1/00* (2006.01)
(Continued)

(52) U.S. Cl.
CPC ....... *H04B 7/15528* (2013.01); *H04L 1/0003* (2013.01); *H04L 1/20* (2013.01); *H04L 5/0051* (2013.01)

(58) Field of Classification Search
CPC ..... H04W 72/20; H04W 72/21; H04W 72/23; H04W 36/36; H04W 52/04; H04W 52/16
(Continued)

(56) References Cited

U.S. PATENT DOCUMENTS 8,873,454 B2 * 10/2014 Chen ..................... H04L 1/1887 370/315
8,948,066 B2 * 2/2015 Kim ...................... H04W 72/21 370/329
(Continued)

FOREIGN PATENT DOCUMENTS

CN 102754357 B * 2/2015 ........... H04L 5/0023
CN 104485984 A * 4/2015 ............. H04B 7/066
(Continued)

OTHER PUBLICATIONS

Coexistence of 3G Repeaters with LTE Base Stations, Woon-Young Yeo, Sang-Min Lee, Gyung-Ho Hwang, 3and Jae-Hoon Kim, Aug. 2013 (Year: 2013).*
(Continued)

*Primary Examiner* — William D Cumming
(74) *Attorney, Agent, or Firm* — Holland & Hart LLP

(57) ABSTRACT

A network entity may employ techniques for wireless communications including obtaining, from a repeater device, an indication of an uplink gain factor associated with uplink transmissions from a user equipment (UE). The network entity may select a precoding matrix associated with downlink transmissions to the UE according to the uplink gain factor. The network entity may output downlink signaling to the UE via the repeater device according to the precoding matrix, a channel rank, and a modulation and coding scheme (MCS) via the repeater device.

30 Claims, 16 Drawing Sheets

(51) Int. Cl.
*H04L 1/20* (2006.01)
*H04L 5/00* (2006.01)

(58) Field of Classification Search
USPC ......... 370/252, 281, 315, 329, 279; 455/522
See application file for complete search history.

(56) References Cited

U.S. PATENT DOCUMENTS

| | | | | |
|---|---|---|---|---|
| 9,281,923 | B2 * | 3/2016 | Kim | H04W 72/23 |
| 9,385,792 | B2 | 7/2016 | Seo et al. | |
| 9,445,417 | B2 * | 9/2016 | Hsu | H04W 36/36 |
| 9,603,107 | B2 * | 3/2017 | Geng | H04W 52/04 |
| 9,621,329 | B2 * | 4/2017 | Kim | H04W 72/20 |
| 10,349,357 | B2 * | 7/2019 | Zhang | H04W 52/34 |
| 2011/0149774 | A1 * | 6/2011 | Chen | H04L 1/1887 370/252 |
| 2013/0077543 | A1 * | 3/2013 | Kim | H04W 72/20 370/281 |
| 2015/0172003 | A1 * | 6/2015 | Kim | H04W 72/20 370/281 |
| 2015/0289266 | A1 * | 10/2015 | Hsu | H04W 72/0446 370/329 |
| 2015/0304964 | A1 * | 10/2015 | Larsson | H04W 52/40 455/522 |
| 2016/0164660 | A1 * | 6/2016 | Kim | H04L 1/1822 370/279 |
| 2017/0318542 | A1 * | 11/2017 | Zhang | H04W 52/16 |
| 2020/0280127 | A1 | 9/2020 | Hormis et al. | |
| 2025/0088887 | A1 * | 3/2025 | Li | H04W 24/10 |
| 2025/0211321 | A1 * | 6/2025 | Wang | H04L 1/0003 |

FOREIGN PATENT DOCUMENTS

| | | | | | |
|---|---|---|---|---|---|
| CN | 104485984 | B | * | 1/2018 | H04L 5/0023 |
| JP | 2013515397 | A | * | 5/2013 | H04L 1/1887 |
| JP | 5529290 | B2 | * | 6/2014 | H04L 1/1887 |
| TW | 424700 | B | * | 1/2014 | H04L 1/1887 |
| TW | 1424700 | B | * | 1/2014 | H04L 1/1887 |

OTHER PUBLICATIONS

Huang Y., et al., "A Limited Feedback Joint Precoding for Amplify-and-Forward Relaying", IEEE Transactions on Signal Processing, IEEE, USA, vol. 58, No. 3, Mar. 1, 2010, pp. 1347-1357, XP011284493, sections II-III.

International Search Report and Written Opinion—PCT/US2024/058499—ISA/EPO—Mar. 31, 2025 (2400231WO).

Mo R., et al., "MMSE-Based Joint Source and Relay Precoding Design for Amplify-and-forward MIMO Relay Networks", IEEE Transactions on Wireless Communications, IEEE Service Center, Piscataway, NJ, US, vol. 8, No. 9, Sep. 1, 2009, pp. 4668-4676, XP011278278, sections II-III.

* cited by examiner 105-c 210-b

Repeater Device 115-c

405 Calculate UL Gain Factor

UL Gain Indication

410

415 Select Precoding Matrix

420 Reference Signal(s)

425 Calculate DL Gain Factor

DL Gain Indication

430

435 Select Channel Rank and MCS

440 DL Signaling

445 DL Signaling

USING SOUNDING REFERENCE SIGNALS (SRS) FOR REPEATER DOWNLINK CHANNEL SOUNDING

FIELD OF TECHNOLOGY

The following relates to wireless communications, including using sounding reference signals (SRS) for repeater downlink channel sounding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A network entity may use sounding reference signals (SRS) for downlink channel sounding when a channel satisfies a threshold based on channel reciprocity. In some cases, a repeater device may affect the channel reciprocity.

SUMMARY

The described techniques relate to improved methods, systems, devices, and apparatuses that support using sounding reference signals (SRS) for repeater downlink channel sounding. For example, the described techniques provide for a network entity obtaining, from a repeater device, an indication of an uplink gain factor associated with uplink transmissions from a user equipment (UE). The network entity may select a precoding matrix associated with downlink transmissions to the UE according to the uplink gain factor. In some examples, the network entity outputs downlink signaling to the UE via the repeater device according to the precoding matrix, a channel rank, and a modulation and coding scheme (MCS) via the repeater device. The network entity may select the channel rank and the MCS according to the uplink gain factor, a downlink gain factor, and the precoding matrix. In some cases, the downlink gain factor is based on one or more first SRS associated with the UE and one or more second SRS associated with the repeater devices. Additionally, or alternatively, the repeater device may output the downlink gain factor to the network entity.

A method for wireless communications by a network entity is described. The method may include obtaining, from a repeater device, an indication of an uplink gain factor associated with uplink transmissions from a UE via the repeater device and outputting downlink signaling to the UE via the repeater device according to a precoding matrix associated with downlink transmissions to the UE via the repeater device, a channel rank, and a MCS, where the precoding matrix is selected according to the uplink gain factor, and where the channel rank and the MCS are selected according to the uplink gain factor, a downlink gain factor, and the precoding matrix.

A network entity for wireless communications is described. The network entity may include one or more memories storing processor executable code, and one or more processors coupled with the one or more memories. The one or more processors may individually or collectively operable to execute the code to cause the network entity to obtain, from a repeater device, an indication of an uplink gain factor associated with uplink transmissions from a UE via the repeater device and output downlink signaling to the UE via the repeater device according to a precoding matrix associated with downlink transmissions to the UE via the repeater device, a channel rank, and a MCS, where the precoding matrix is selected according to the uplink gain factor, and where the channel rank and the MCS are selected according to the uplink gain factor, a downlink gain factor, and the precoding matrix.

Another network entity for wireless communications is described. The network entity may include means for obtaining, from a repeater device, an indication of an uplink gain factor associated with uplink transmissions from a UE via the repeater device and means for outputting downlink signaling to the UE via the repeater device according to a precoding matrix associated with downlink transmissions to the UE via the repeater device, a channel rank, and a MCS, where the precoding matrix is selected according to the uplink gain factor, and where the channel rank and the MCS are selected according to the uplink gain factor, a downlink gain factor, and the precoding matrix.

A non-transitory computer-readable medium storing code for wireless communications is described. The code may include instructions executable by one or more processors to obtain, from a repeater device, an indication of an uplink gain factor associated with uplink transmissions from a UE via the repeater device and output downlink signaling to the UE via the repeater device according to a precoding matrix associated with downlink transmissions to the UE via the repeater device, a channel rank, and a MCS, where the precoding matrix is selected according to the uplink gain factor, and where the channel rank and the MCS are selected according to the uplink gain factor, a downlink gain factor, and the precoding matrix.

Some examples of the method, network entities, and non-transitory computer-readable medium described herein may further include operations, features, means, or instructions for obtaining one or more first SRS associated with the UE via the repeater device and obtaining one or more second SRS associated with the repeater device, where the downlink gain factor may be based on the one or more first SRS and the one or more second SRS.

Some examples of the method, network entities, and non-transitory computer-readable medium described herein may further include operations, features, means, or instructions for estimating a channel quality between the network entity and the repeater device based on the one or more second SRS, where the downlink gain factor may be further based on the estimated channel quality.

Some examples of the method, network entities, and non-transitory computer-readable medium described herein may further include operations, features, means, or instructions for selecting the precoding matrix may be further based on the downlink gain factor.

Some examples of the method, network entities, and non-transitory computer-readable medium described herein may further include operations, features, means, or instructions for selecting the channel rank and the MCS may be based on an updated downlink gain factor, the updated downlink gain factor based on the precoding matrix.

Some examples of the method, network entities, and non-transitory computer-readable medium described herein may further include operations, features, means, or instructions for selecting the channel rank and the MCS may be based on an updated precoding matrix and the updated precoding matrix may be selected based on the downlink gain factor.

Some examples of the method, network entities, and non-transitory computer-readable medium described herein may further include operations, features, means, or instructions for outputting one or more reference signals to the repeater device and obtaining an indication of the downlink gain factor from the repeater device based on outputting the one or more reference signals.

In some examples of the method, network entities, and non-transitory computer-readable medium described herein, the one or more reference signals may be output in accordance with the precoding matrix.

In some examples of the method, network entities, and non-transitory computer-readable medium described herein, a relationship between the uplink gain factor and the downlink gain factor may be based on a product of a first value and an identity matrix.

In some examples of the method, network entities, and non-transitory computer-readable medium described herein, the first value varies over time.

A method for wireless communications by a repeater device is described. The method may include outputting, to a network entity, an indication of an uplink gain factor associated with uplink transmissions from a UE, obtaining downlink signaling according to a channel rank and a MCS corresponding to the uplink gain factor and a downlink gain factor, and forwarding the downlink signaling to the UE.

A repeater device for wireless communications is described. The repeater device may include one or more memories storing processor executable code, and one or more processors coupled with the one or more memories. The one or more processors may individually or collectively operable to execute the code to cause the repeater device to output, to a network entity, an indication of an uplink gain factor associated with uplink transmissions from a UE, obtain downlink signaling according to a channel rank and a MCS corresponding to the uplink gain factor and a downlink gain factor, and forward the downlink signaling to the UE.

Another repeater device for wireless communications is described. The repeater device may include means for outputting, to a network entity, an indication of an uplink gain factor associated with uplink transmissions from a UE, means for obtaining downlink signaling according to a channel rank and a MCS corresponding to the uplink gain factor and a downlink gain factor, and means for forwarding the downlink signaling to the UE.

A non-transitory computer-readable medium storing code for wireless communications is described. The code may include instructions executable by one or more processors to output, to a network entity, an indication of an uplink gain factor associated with uplink transmissions from a UE, obtain downlink signaling according to a channel rank and a MCS corresponding to the uplink gain factor and a downlink gain factor, and forward the downlink signaling to the UE.

Some examples of the method, repeater devices, and non-transitory computer-readable medium described herein may further include operations, features, means, or instructions for forwarding, to the network entity, one or more first SRS associated with the UE and outputting, to the network entity, one or more second SRS associated with the repeater device, where the downlink signaling may be based on the one or more first SRS and the one or more second SRS.

Some examples of the method, repeater devices, and non-transitory computer-readable medium described herein may further include operations, features, means, or instructions for obtaining one or more downlink reference signals and outputting an indication of the downlink gain factor to the network entity, where the downlink gain factor may be based on the one or more downlink reference signals, and where the downlink signaling may be based on the downlink gain factor.

In some examples of the method, repeater devices, and non-transitory computer-readable medium described herein, the downlink gain factor may be based on interference associated with one or more wireless devices.

In some examples of the method, repeater devices, and non-transitory computer-readable medium described herein, the uplink gain factor and the downlink gain factor each satisfy a respective threshold based on a first quantity of power associated with each respective antenna of a set of antennas of the repeater device or a second quantity of power associated with of the set of antennas.

In some examples of the method, repeater devices, and non-transitory computer-readable medium described herein, the uplink gain factor and the downlink gain factor each satisfy a respective threshold associated with a channel reciprocity.

In some examples of the method, repeater devices, and non-transitory computer-readable medium described herein, a relationship between the uplink gain factor and the downlink gain factor may be based on a product of a first value and an identity matrix. In some examples of the method, repeater devices, and non-transitory computer-readable medium described herein, the first value varies over time.

DETAILED DESCRIPTION

Figure 1:
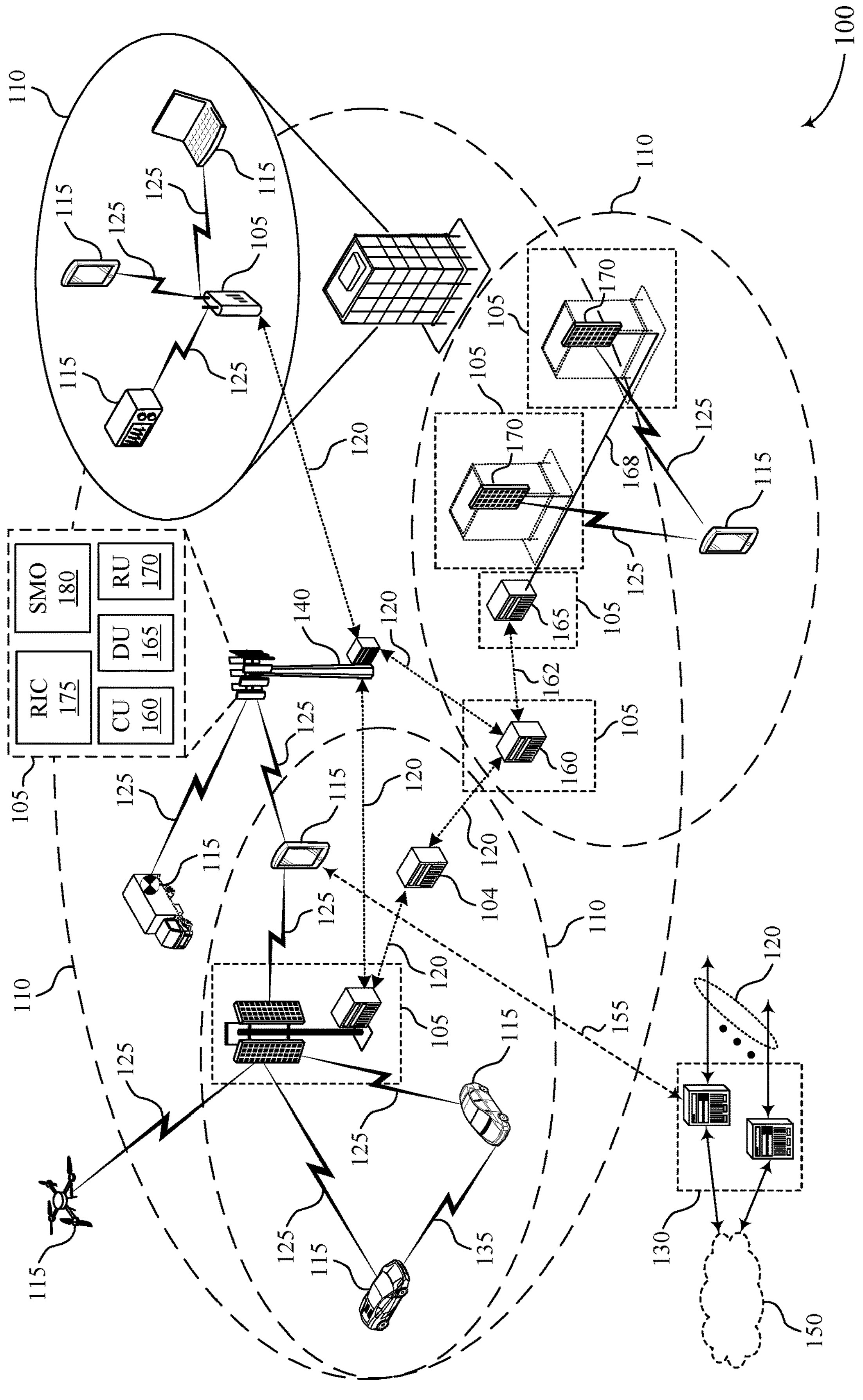
FIGS. 1 and 2 show examples of wireless communications systems that support using sounding reference signals (SRS) for repeater downlink channel sounding in accordance with one or more aspects of the present disclosure.

In some wireless communications systems, a repeater device may amplify and forward transmissions between a network entity and a user equipment (UE). The repeater device may receive and forward signals, which may be affected by an uplink gain factor and a downlink gain factor. The repeater device may tune the uplink gain factor and the downlink gain factor to respectively satisfy a per-antenna power constraint, or a total power constraint for all antennas of the repeater device. In some cases, the uplink gain factor and the downlink gain factor may be unknown to the network entity.

In some examples, the network entity may measure sounding reference signals (SRSs) to determine a channel rank, and a modulation and coding scheme (MCS) for transmissions to the UE. The network entity may select the channel rank and the MCS based on an estimated channel quality of the link between the network entity and the UE. In some wireless communications systems (e.g., that include a repeater device), the network entity may select the channel rank and the MCS based on a first channel quality between the network entity and the repeater device (e.g., a first hop) and a second channel between the repeater and the UE (e.g., a second hop). In some examples, the repeater device may tune the uplink gain factor and the downlink gain factor to maintain channel reciprocity between the first channel and the second channel. The channel rank and MCS for downlink transmissions (e.g., based on SRS measurements), may be based on channel reciprocity between the first channel and the second channel. In some cases, the channel reciprocity may be based on a relationship between the uplink gain factor and the downlink gain factor. But the network entity may not have access to information regarding such a relationship between the uplink gain factor and the downlink gain factor, and may therefore not be able to calculate the channel rank and MCS based on the SRSs without additional information related to the uplink gain factor and the downlink gain factor at the repeater.

The wireless communications system, according to techniques described herein, may support using SRSs for repeater downlink channel sounding based on a repeater device providing information to assist a network entity in selecting one or more of a precoding matrix, rank, an MCS. For example, the repeater device may transmit an indication of an uplink gain factor to the network entity such that the network entity may select the channel rank and the MCS based on selecting a precoding matrix, the uplink gain factor, and a downlink gain factor. In some examples, the repeater device may transmit SRSs associated with the first channel to the network entity, and the network entity may determine the downlink gain factor based on the uplink gain factor and the SRS associated with the first channel. Additionally, or alternatively, the network entity may select the precoding matrix based on the uplink gain factor indication and may transmit downlink reference signals to the repeater device. For example, the repeater device may calculate the downlink gain factor based on the downlink reference signals and may transmit an indication of the downlink gain factor to the network entity. In some cases, the repeater device may compute the downlink gain factor based on interference from other wireless devices.

Aspects of the disclosure are initially described in the context of wireless communications systems. Aspects of the disclosure are further illustrated by and described with reference to process flows. Aspects of the disclosure are further illustrated by and described with reference to apparatus diagrams, system diagrams, and flowcharts that relate to using sounding reference signals (SRS) for repeater downlink channel sounding.

FIG. 1 shows an example of a wireless communications system 100 that supports using SRS for repeater downlink channel sounding in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support using SRS for repeater downlink channel sounding as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI)

may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, the network entity 105 may measure received SRSs for a channel between the network entity 105 and the UE 115 to select a channel rank, and an MCS. In some wireless communications systems, the network entity 105 may select the channel rank and the MCS based on an estimated channel quality of the link between the network entity 105 and the UE 115. For example, the network entity 105 may determine a first ratio of transmitted power at the network entity 105 to a quantity of transmission antennas at the network entity 105 and a second ratio of transmitted power at the UE 115 to a quantity of transmission antennas at the UE 115. The network entity 105 may estimate the channel quality based on receiving the SRSs and an UL SRS power. In some cases, the network entity 105 may perform singular value decomposition (SVD) of the channel quality to select a precoding matrix. In such cases, the network entity 105 may select the channel rank and the MCS based on the precoding matrix and the first ratio. In some cases, the network entity 105 may determine the channel rank, and the MCS based on a noise power (e.g., the transmission power at the network entity 105 may be used to estimate expected signal-to-noise ratio (SNR)).

In some wireless communications systems 100, a repeater device may amplify and forward transmissions between the network entity 105 and the UE 115. The repeater device may receive and forward signals, which experience an uplink gain factor and a downlink gain factor. The repeater device may tune the uplink gain factor and the downlink gain factor to respectively satisfy a per-antenna power constraint, or a total power constraint for all antennas of the repeater device. In some cases, the uplink gain factor and the downlink gain factor may be unknown to the network entity 105.

In some wireless communications systems 100, the network entity 105 may select the channel rank and the MCS based on a first channel between the network entity 105 and the repeater device (e.g., a first hop) and a second channel between the repeater and the UE 115 (e.g., a second hop). In some examples, the repeater device may tune the uplink gain factor and the downlink gain factor to maintain channel reciprocity between the first channel and the second channel. The channel reciprocity may enable the network entity 105 to select the channel rank and the MCS for downlink transmissions (e.g., based on SRS measurements). However, in some other wireless communications systems, a network entity may not select a channel rank and an MCS without additional information associated with an uplink gain factor and a downlink gain factor at a repeater device.

The wireless communications system 100 may support using SRS for repeater downlink channel sounding. For example, a repeater device may transmit an indication of an uplink gain factor to a network entity 105 such that the network entity 105 may select a channel rank and an MCS based on selecting a precoding matrix, the uplink gain factor, and a downlink gain factor. In some examples, the repeater device transmits SRS associated with the first channel to the network entity 105, and the network entity 105 determines the downlink gain factor based on the uplink gain factor and the SRS associated with the first channel. Additionally, or alternatively, the network entity 105 may select the precoding matrix based on the uplink gain factor indication and transmit downlink reference signals to the repeater device. For example, the repeater device calculates the downlink gain factor based on the downlink reference signals and transmits an indication of the downlink gain factor to the network entity 105. In some cases, the repeater device computes the downlink gain factor based on interference from other wireless devices.

Figure 2:
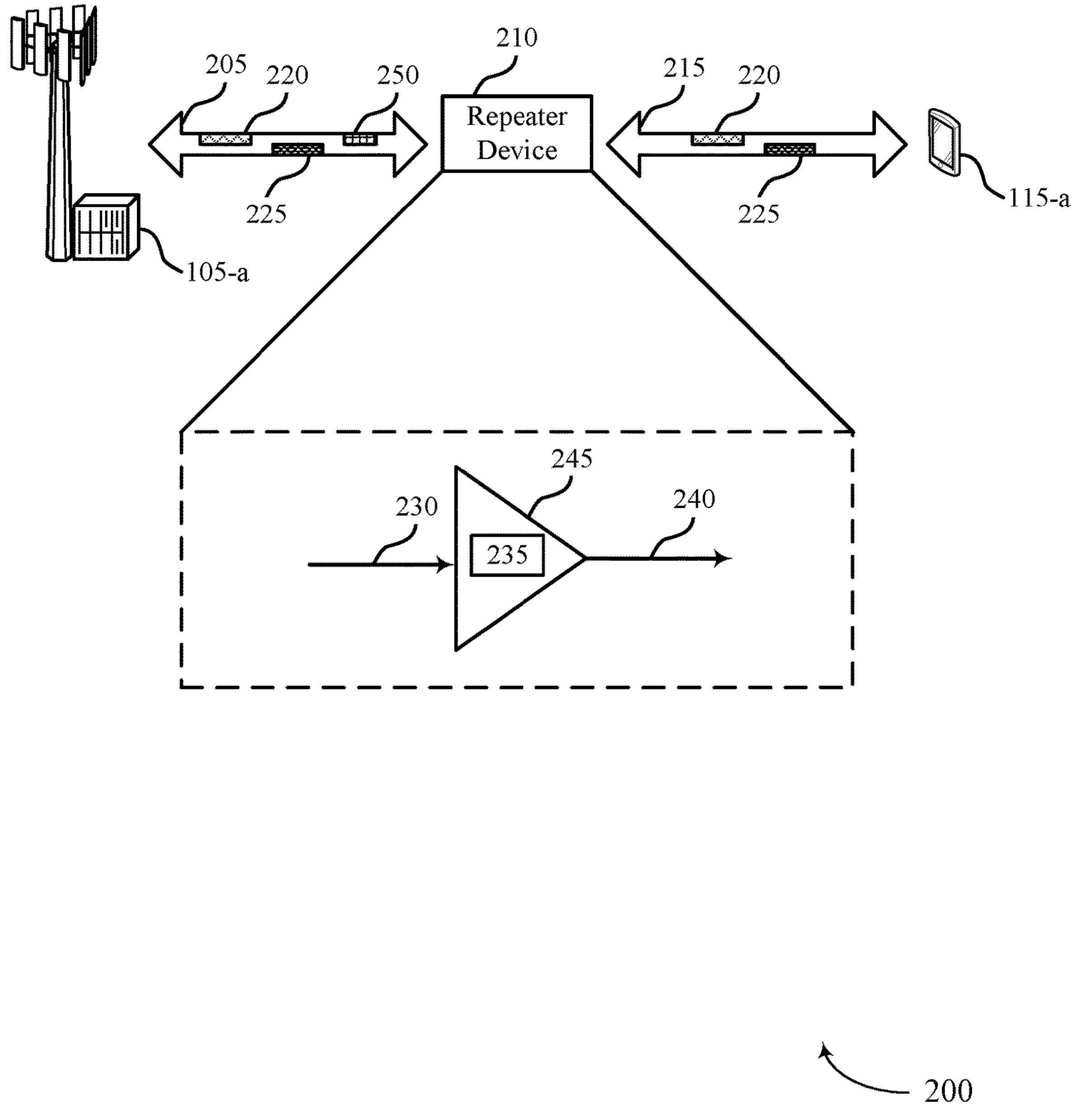

FIG. 2 shows an example of a wireless communications system 200 that supports using SRS for repeater downlink channel sounding in accordance with one or more aspects of the present disclosure. In some examples, the wireless communications system 200 may implement or be implemented by aspects of the wireless communications system 100. For example, the wireless communications system 200 may include one or more network entities 105 (e.g., a network entity 105-*a*) and one or more UEs 115 (e.g., a UE 115-*a*), which may be examples of the corresponding devices as described with reference to FIG. 1. In some examples, the network entity 105-*a* may transmit signaling to the UE 115-*a* via a repeater device 210. For example, the network entity 105-*a* may transmit downlink signaling 225 to the repeater device 210 via a channel 205, and the repeater device 210 may amplify and forward the downlink signaling 225 to the UE 115-*a* via a channel 215. Similarly, the UE 115-*a* may transmit uplink signaling 220 to the network entity 105-*a*. For example, the UE 115-*a* may transmit the uplink signaling 220 to the repeater device 210 via the channel 215, and the repeater device 210 may amplify and forward the uplink signaling 220 to the network entity 105-*a*.

The repeater device 210 may facilitate wireless communications between various wireless devices (e.g., in a multi-hop deployment). For example, the repeater device 210 may receive and forward signaling between the UE 115-*a* and the network entity 105-*a* (e.g., the uplink signaling 220 and the downlink signaling 225). The repeater device 210 may receive one or more input signals 230 (e.g., one or more SRSs) using one or more antennas 245 (e.g., one or more receive antennas), and may generate one or more output signals 240 (e.g., may forward the received SRSs) for transmission to the network entity 105-*a* via the channel 205 using one or more antennas 245 (e.g., one or more transmit antennas). In some examples, the repeater device 210 may apply a one-to-one antenna to output antenna amplification. In some examples, the repeater device 210 may apply a gain factor 235 to the one or more output signals 240. The gain factor 235 for each antenna of the one or more antennas 245 may be set to satisfy a per-antenna power constraint, or a total power constraint over all transmit antennas (e.g., of the one or more antennas 245) at the repeater device 210. Additionally, or alternatively, the repeater device 210 may receive the one or more input signals 230 from the UE 115-*a*, apply the gain factor 235, and transmit the one or more output signals 240 to the network entity 105-*a* via the channel 205 (e.g., the repeater device 210 may operate in an uplink direction, a downlink direction, or both).

In some examples, a value of the gain factor 235 may be based on whether a respective signal is traveling in the uplink direction or the downlink direction (e.g., the repeater device 210 may determine an uplink gain factor and a downlink gain factor). For example, the value of the gain factor 235 may be different for the uplink signaling 220 than for downlink signaling 225. In some examples, the values of the gain factor 235 in the uplink and in the downlink may respectively satisfy a power threshold based on power per antenna of the repeater device 210, a power threshold based on a set of antennas of the repeater device 210 (e.g., all antennas of the repeater device 210), or both. Additionally, or alternatively, the value of the gain factor 235 in the uplink and the value of the gain factor 235 in the downlink may be defined as a diagonal matrix which may be applied to the one or more antennas 245 at the repeater device 210 (e.g., to boost the repeater transmitted power).

In some examples, SRSs may be used for downlink channel sounding with the repeater device 210. In such examples, the network entity 105-*a* transmits the downlink signaling 225 (e.g., via the channel 205). In some cases, the repeater device 210 receives the downlink signaling 225 (e.g., first reference signals) via the channel 205 (e.g., associated with a channel quality, $H_1$). The repeater device 210 may apply the gain factor 235 (e.g., a downlink gain factor, $G_{DL}$) and forward the downlink signaling 225 to the UE 115-*a* via the channel 215 (e.g., associated with a channel quality, $H_2$). In some examples, the downlink transmission is affected by noise (e.g., a noise $Z_1$) associated with the channel 205 or the channel 215 (e.g., noise based on interference from other wireless devices, physical barriers between the network entity 105-*a* and the UE 115-*a*, or the like). The UE 115-*a* may receive a downlink signal, $Y_{DL}$, represented by Equation 1 below.

$$Y_{DL} = \sqrt{\frac{P_{NB}}{Nt_{NB}}} * H_2 * G_{DL} * H_1 * X_{DL} + Z_1 \quad \text{Equation 1}$$

With reference to Equation 1, $X_{DL}$ may represent the transmission of the first reference signals in the downlink signaling 225, $P_{NB}$ may represent the transmitted power at the network entity 105-*a*, and $Nt_{NB}$ may represent a quantity of transmission antennas at the network entity 105-*a*.

In some examples, the UE 115-*a* transmits uplink signaling 220 (e.g., first reference signals, such as SRSs). In some examples, the UE 115-*a* may transmit the uplink signaling 220 in response to receiving the downlink signal, $Y_{DL}$. In some cases, the repeater device 210 receives the uplink signaling 220 (e.g., first reference signals) via the channel 215 (e.g., associated with the channel quality, $H_2$). The repeater device 210 may apply the gain factor 235 (e.g., an uplink gain factor, $G_{UL}$) and forward the uplink signaling 220 to the network entity 105-*a* via the channel 205. In some examples, the uplink transmission is affected by noise (e.g., a noise, $Z_2$) associated with the channel 205 or the channel 215. The network entity 105-*a* may receive an uplink signal, $Y_{UL}$, represented by Equation 2 below.

$$Y_{UL} = \sqrt{\frac{P_{UE}}{Nt_{UE}}} * H_1^T * G_{UL} * H_2^T * X_{UL} + Z_2 \quad \text{Equation 2}$$

With reference to Equation 2, $X_{UL}$ may represent the transmission of the first reference signals in the uplink signaling 220, $P_{UE}$ may represent the transmitted power at the UE 115-*a*, $Nt_{NB}$ may represent a quantity of transmission antennas at the UE 115-*a*, $$H_1^T$$

may represent a transpose of the quality of the channel 205, and $$H_2^T$$

may represent a transpose of the quality of the channel 215.

In some examples, the network entity 105-*a* may communicate with the UE 115-*a* without the repeater device 210. In these examples, the network entity 105-*a* may have access to information regarding both transmitted power, quantity of transmission antennas at the network entity 105-*a*, and quantity of transmission antennas at the UE 115-*a* (e.g., and may thus be able to determine $$\frac{P_{NB}}{Nt_{NB}} \text{ for } Y_{DL} \text{ and } \frac{P_{UE}}{Nt_{UE}} \text{ for } Y_{UL}\Big).$$

Based on a received SRS at the network entity 105-*a*, and an uplink SRS power, the network entity 105-*a* may estimate a channel H. Based on the estimated channel H, the network entity 105-*a* may perform SVD of the channel H to select a precoding matrix V, as described in greater detail with reference to FIG. 1. Based thereon, the network entity 105-*a* may determine a rank and an MCS (e.g., according to $$\sqrt{\frac{P_{Nb}}{Nt_{Nb}}} * H * V\Big).$$

However, as described herein, such calculations may be more challenging based on the uplink gain factor, the downlink gain factor, and the multi-hop deployment introduced with the implementation of the repeater device 210, as the network entity 105-*a* may lack access to relevant information.

The UE 115-*a* or the network entity 105-*a* may identify a relationship between the uplink gain factor and the downlink gain factor. In some examples (e.g., to maintain channel reciprocity), the uplink gain factor may be equal to a factor of the transpose of the downlink gain factor. For example, the repeater device 210 may set the uplink gain factor to equal a product of a value and an identity matrix. Additionally, or alternatively, the repeater device 210 may set the downlink gain factor equal to a product of a value and an identity matrix. In some cases, the value for the uplink gain factor and the value for the downlink gain factor are different and vary with time. As described herein, the term uplink gain factor, the term downlink gain factor, or both, may refer to a value for the respective uplink gain factor and the downlink gain factor, a constant, a value multiplied by an identify matrix, or any combination thereof. In other words, as described herein, one or more devices may identify or transmit indications of the relationship between the uplink gain factor, the downlink gain factor, or both, and such indications may include a value for the respective uplink gain factor and the downlink gain factor, a constant, a value multiplied by an identify matrix, or the like.

In some examples, the repeater device 210 computes the downlink gain factor based on receiving the downlink signaling 225 from the network entity 105-*a* (e.g., the first reference signals). In some cases, the network entity 105-*a* selects a precoding matrix (e.g., a precoding matrix, V) to apply to the signals. The repeater device 210 may receive the downlink signaling 225 according to Equation 3 below.

$$Y_R = \sqrt{\frac{P_{NB}}{Nt_{NB}}} * H_1 * V \qquad \text{Equation 3}$$

In some cases, the network entity 105-*a* may select a precoding matrix, a MCS, and a channel rank based on the channel 205 quality, $H_1$, the channel 215 quality, $H_2$, the uplink gain factor, $G_{UL}$, and the square root of a ratio between a transmission power (e.g., the transmission power at the network entity 105-*a*, $P_{NB}$) and a quantity of antennas (e.g., a quantity at the network entity 105-*a*, $Nt_{NB}$). For example, the network entity 105-*a* may determine a value $Y_P$ (based on which the network entity 105-*a* may select the precoding matrix V, the MCS, and the rank) according to Equation 4.

$$Y_P = \sqrt{\frac{P_{NB}}{Nt_{NB}}} * H_2 * G_{DL} * H_1 \qquad \text{Equation 4}$$

However, the network entity 105-*a* may have access to (e.g., as represented in Equation 2) the transpose of the channel 205 quality, the transpose of the channel 215 quality, and the uplink gain factor. In such cases, the network entity 105-*a* may not be able to determine the precoding matrix, the MCS, or the channel rank without receiving or determining more information about the uplink gain factor, $G_{UL}$, and the channel 205 quality, $H_1$. Additionally, the network entity 105-*a* may not be able to compute the downlink gain factor, $G_{DL}$, to estimate an expected SNR at the UE 115-*a* without selecting the precoding matrix, V. However, the network entity 105-*a* may not be able to select the precoding matrix V without access to information about the downlink gain factor. Techniques described herein may provide the network entity 105-*a* with sufficient information (e.g., regarding a relationship between the downlink gain factor and the uplink gain factor) to effectively select the precoding matrix V, the MCS, and the rank, for subsequent downlink transmissions to the UE 115-*a* via the repeater device 210.

The wireless communications system 200 may support using SRS for repeater downlink channel sounding, such that the network entity 105-*a* may select the precoding matrix, the MCS, and the channel rank. In some examples, the repeater device 210 feeds back the uplink gain factor, $G_{UL}$, to the network entity 105-*a*. In addition to SRSs transmitted by the UE 115-*a*, the repeater device 210 may transmit SRSs to the network entity 105-*a*, based on which the network entity 105-*a* may estimate $H_1$. For example, the repeater device 210 may forward SRSs received from the UE 115-*a*, may transmit an uplink gain indication 250, and may transmit second reference signals (e.g., additional SRSs) to the network entity 105-*a* in the uplink signaling 220. In such examples, the uplink gain indication 250 indicates the uplink gain factor, $G_{UL}$, and the second reference signals enable the network entity 105-*a* to estimate the channel 205 quality, $H_1$. The network entity 105-*a* may select the MCS and the channel rank based on the uplink gain indication 250 and the second reference signals (e.g., as described further with reference to FIG. 3).

For example, as further described with reference to FIG. 3, the network entity 105-*a* may receive the uplink gain indication 250 from the repeater device 210, the SRSs forward by the repeater device 210 from the UE 115-*a* (e.g., first SRSs) and the additional (e.g., second) SRSs transmitted by the repeater device 210. The network entity 105-*a* may estimate $H_1$, and compute $G_{DL}$ and the precoding matrix, V. The network entity 105-*a* may set an initial precoding matrix V equal to an identify matrix. The network entity 105-*a* may calculate $G_{DL}$ based on $$\sqrt{\frac{P_{Ng}}{Nt_{Nb}}} * H_1 * V,$$

where V is the identity matrix. The network entity 105-*a* may compute an updated precoding matrix V based on $$\sqrt{\frac{P_{Nb}}{Nt_{Nb}}} * H_2 * G_{DL} * H_1,$$

and may then compute an updated $G_{DL}$ based on $$\sqrt{\frac{P_{Nb}}{Nt_{Nb}}} * H_1 * V,$$

where V is the updated precoding matrix. The network entity 105-*a* may perform multiple iterations of such procedures, updating the precoding matrix V based on a most recently calculated or updated $G_{DL}$, and recalculating $G_{DL}$ based on most recently calculated or updated precoding matrix V.

Additionally, or alternatively, the repeater device 210 may feedback the uplink gain $G_{UL}$ to the network entity 105-*a*. The network entity 105-*a* may compute the precoding matrix V, and may transmit downlink reference signals to the repeater device 210 using the precoding matrix V. The repeater device 210 may compute $G_{DL}$ and feedback the calculated $G_{DL}$ to the network entity 105-*a*. After determining the precoding matrix V and receiving the indication of $G_{DL}$, the network entity 105-*a* may determine the channel rank and MCS for subsequent downlink transmissions. For example, the repeater device 210 may transmit the uplink gain indication 250, receive downlink reference signals, and transmit a downlink gain indication to the network entity 105-*a*. In some examples, the downlink gain indication indicates the downlink gain factor, $G_{DL}$, and the network entity 105-*a* selects the MCS and the channel rank based on receiving the downlink gain indication (e.g., as described further with reference to FIG. 4).

For example, as described in greater detail with reference to FIG. 4, the network entity 105-*a* may receive the uplink gain indication 250 from the repeater device 210. The network entity 105-*a* may compute the precoding matrix V, and may transmit downlink reference signals to the repeater device 210 using the precoding matrix V. For instance, the network entity 105-*a* may set an initial precoding matrix V equal to an identify matrix. The network entity 105-*a* may calculate $G_{DL}$ based on $$\sqrt{\frac{P_{Nb}}{Nt_{Nb}}} * H_1 * V$$

where V is the identity matrix. The network entity 105-*a* may compute an updated precoding matrix V based on $$\sqrt{\frac{P_{Nb}}{Nt_{Nb}}} * H_2 * G_{DL} * H_1.$$

Based on the updated precoding matrix V', the network entity 105-*a* may transmit downlink reference signals to the repeater device 210. The repeater device 210 may calculate an updated value for $G_{DL}$ and feedback the calculated $G_{DL}$ to the network entity 105-*a*. The updated $G_{DL}$ indicated by the repeater device 210 to the network entity 105-*a* may be more accurate than the initial or previous $G_{DL}$ calculated by the network entity 105-*a*, because the $G_{DL}$ calculated at the repeater device 210 may take into account interference by other nodes. After determining the precoding matrix V and receiving the indication of $G_{DL}$, the network entity 105-*a* may determine the channel rank and MCS for subsequent downlink transmissions.

Figure 3:
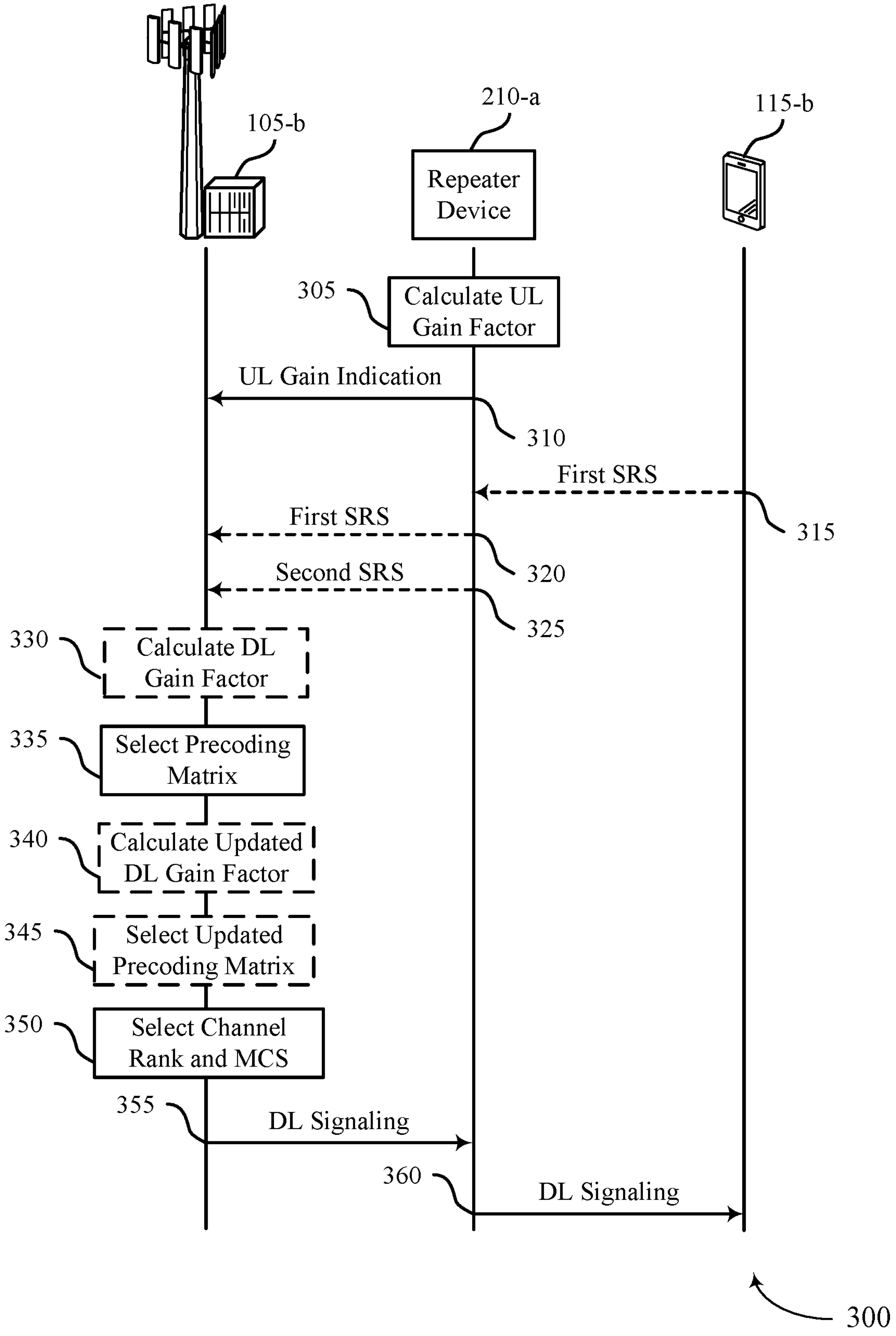
FIGS. 3 and 4 show examples of process flows that support using SRS for repeater downlink channel sounding in accordance with one or more aspects of the present disclosure.

FIG. 3 shows an example of a process flow 300 that supports using SRS for repeater downlink channel sounding in accordance with one or more aspects of the present disclosure. The process flow 300 may be performed by aspects of the wireless communications system 100 or the wireless communications system 200, as described herein with reference to FIGS. 1 and 2. For example, a network entity 105-*b*, a repeater device 210-*a*, and a UE 115-*b*, which may be examples of a network entity 105, a UE 115, and a repeater device 210 as described herein, may perform aspects of the process flow 300. In the following description of the process flow 300, operations performed by the network entity 105-*b*, the repeater device 210-*a*, and the UE 115-*b* may be performed in a different order than is shown. Some operations may be omitted from the process flow 300, and other operations may be added to the process flow 300. Further, although some operations or signaling may be shown to occur at different times for discussion purposes, these operations may occur at the same time. In some examples, the following calculations performed by the repeater device 210-*a* or the network entity 105-*b* may include, or be described as, computations, determinations, or selections by the repeater device 210-*a* or the network entity 105-*b*.

At 305, the repeater device 210-*a* may calculate an uplink gain factor associated with uplink transmissions from the UE 115-*b*. In some examples, at 310, the repeater device 210-*a* may output (e.g., transmit) an indication of the uplink gain factor to the network entity 105-*b*.

In some examples, at 315, the repeater device 210-*a* receives one or more first SRS from the UE 115-*b*. In some examples, at 320, the repeater device 210-*a* forwards the one or more first SRS to the network entity 105-*b*. At 325, the repeater device 210-*a* may output one or more second SRS to the network entity 105-*b*. In such examples, the additional SRSs may be provided to the network entity 105-*b* to assist in calculation of the downlink gain factor, selection of a precoding matrix, or both.

In some examples, the network entity may iteratively calculate the downlink gain factor, select the precoding matrix, or both (e.g., at one or more of 330, 335, 340, and 345). For example, having received an indication of the uplink gain factor from the repeater device 210-*a* (e.g., at 310), the network entity 105-*b* may set an initial precoding matrix (e.g., an identify matrix), compute an initial downlink gain factor based thereon, compute an updated precoding matrix based on the computed downlink gain factor, and then compute an updated downlink gain factor based on the updated downlink gain factor (e.g., or may perform any quantity of iterations to calculate updated values for the downlink gain factor or the precoding matrix, or both). In some examples, the network entity 105-*b* may set an initial value for the downlink gain factor (e.g., using an initial or default constant or ratio between the uplink gain factor and the downlink gain factor) and use the initial downlink gain factor to compute an initial precoding matrix. The initial precoding matrix may be used to calculate an updated downlink gain factor, which may be used to calculate an updated precoding matrix, through any number of iterations.

In some examples, at 330, the network entity 105-*b* calculates a downlink gain factor based on the one or more first SRS, the one or more second SRS, or any combination thereof. The network entity 105-*b* may estimate a channel quality, $H_1$, between the network entity 105-*b* and the repeater device 210-*a* based on the one or more second SRS. In some cases, the network entity 105-*b* calculates the downlink gain factor based on the estimated channel quality. In some examples, the network entity 105-*b* may set a precoding matrix, V, as an identity matrix and calculate the downlink gain factor, $G_{DL}$ based on the estimated channel quality, $H_1$, using Equation 3.

At 335, the network entity 105-*b* may select a precoding matrix associated with downlink transmissions to the UE 115-*b* via the repeater device 210-*a*. For example, the network entity 105-*b* may select the precoding matrix according to the uplink gain factor (e.g., using Equation 4). In some cases, the network entity 105-*b* selects the precoding matrix based on calculating the downlink gain factor. For example, the network entity 105-*b* may select the precoding matrix based on calculating the downlink gain factor with Equation 3. In some examples, at 340, the network entity 105-*b* calculates an updated downlink gain factor based on selecting the precoding matrix (e.g., with Equation 4). For example, the network entity 105-*b* may calculate the updated downlink gain factor based on using the selected precoding matrix in Equation 3.

Additionally, or alternatively, at 345, the network entity 105-*b* may select an updated precoding matrix based at least in part on the downlink gain factor. For example, the network entity 105-*b* may update the precoding matrix V based on a most recently calculated or updated $G_{DL}$ using Equations 3 and 4.

At 350, the network entity 105-*b* may select a channel rank and a MCS based on the uplink gain factor, the downlink gain factor, the precoding matrix, or any combination thereof. In some examples, the network entity 105-*b* selects the channel rank and the MCS based on the updated downlink gain factor. Additionally, or alternatively, the network entity 105-*b* may select the channel rank and the MCS based on the updated precoding matrix.

At 355, the network entity 105-*b* may output downlink signaling to the UE 115-*b* according to the precoding matrix, the channel rank and the MCS. In some examples, at 360, the repeater device 210-*a* forwards the downlink signaling to the UE 115-*b*. In some cases, the network entity 105-*b* outputs the downlink signaling based on the one or more first SRS, the one or more second SRS, or both.

In some examples, a relationship between the uplink gain factor and the downlink gain factor is based on a product of a first value and an identity matrix. In some cases, the first value varies over a duration. Additionally, or alternatively, the uplink gain factor and the downlink gain factor may each satisfy a respective threshold based at least in part on a first quantity of power associated with each respective antenna of a set of antennas of the repeater device 210-*a*, a second quantity of power associated with the set of antennas, or both. In some examples, the uplink gain factor and the downlink gain factor each satisfy a respective threshold associated with a channel reciprocity. In some examples, as described in more detail with reference to FIG. 4, the repeater device 210-*a* may transmit the downlink gain factor to the network entity 105-*b*.

Figure 4:
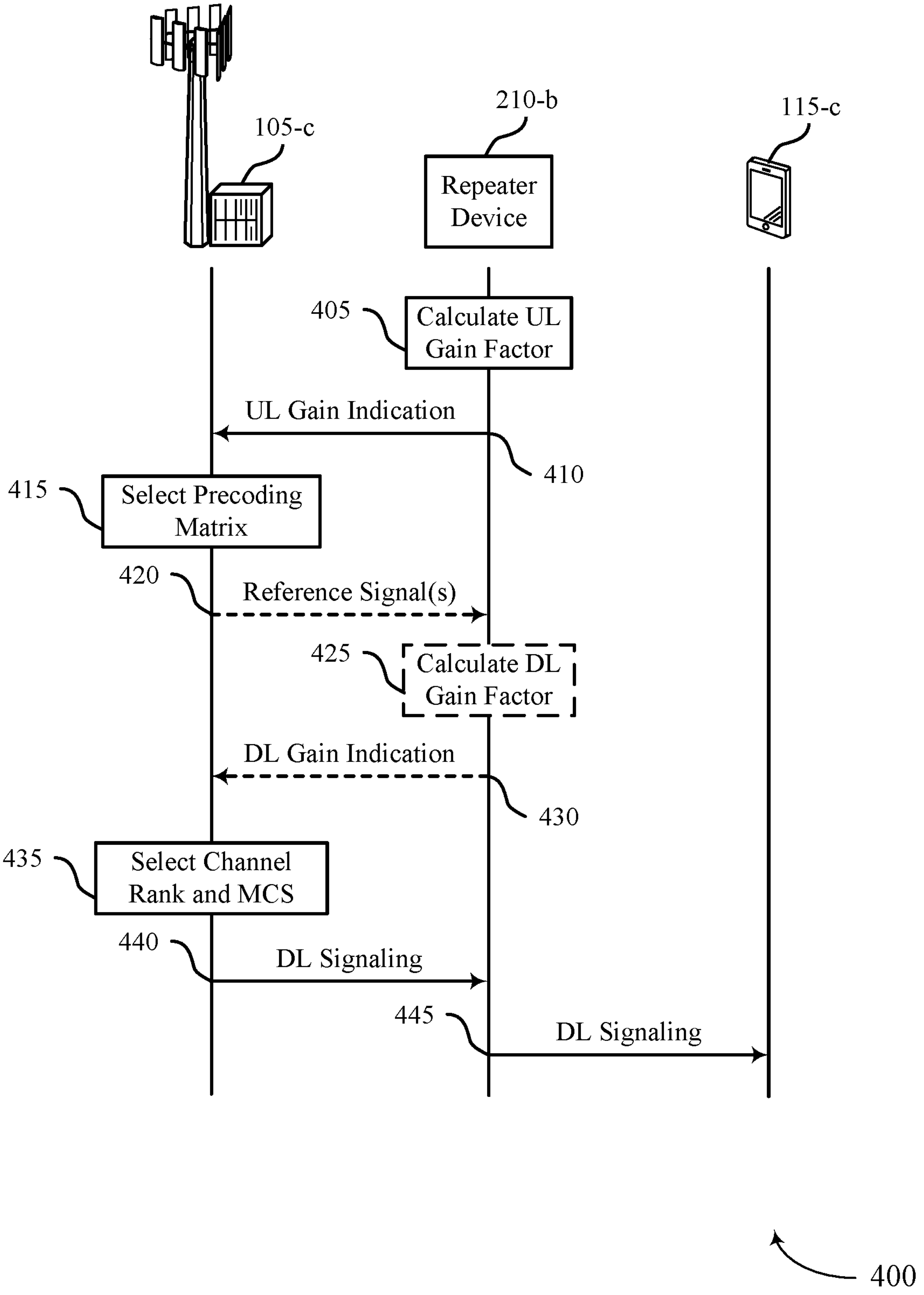

FIG. 4 shows an example of a process flow 400 that supports using SRS for repeater downlink channel sounding in accordance with one or more aspects of the present disclosure. The process flow 400 may be performed by aspects of the wireless communications system 100 or the wireless communications system 200, as described herein with reference to FIGS. 1 and 2. For example, a network entity 105-*c*, a repeater device 210-*b*, and a UE 115-*c*, which may be examples of a network entity 105, a UE 115, and a repeater device 210 as described herein, may perform aspects of the process flow 400. In the following description of the process flow 400, operations performed by the network entity 105-*c*, the repeater device 210-*b*, and the UE 115-*c* may be performed in a different order than is shown. Some operations may be omitted from the process flow 400, and other operations may be added to the process flow 400. Further, although some operations or signaling may be shown to occur at different times for discussion purposes, these operations may occur at the same time.

In some examples, the following calculations performed by the repeater device 210-*b* or the network entity 105-*c* may include, or be described as, computations, determinations, or selections by the repeater device 210-*b* or the network entity 105-*c*.

At 405, the repeater device 210-*b* may calculate an uplink gain factor associated with uplink transmissions from the UE 115-*c*. In some examples, at 410, the repeater device 210-*a* outputs (e.g., transmit) an indication of the uplink gain factor to the network entity 105-*c*.

At 415, the network entity 105-*c* may select a precoding matrix associated with downlink transmissions to the UE 115-*c* via the repeater device 210-*b*. For example, the network entity 105-*c* may select the precoding matrix according to the uplink gain factor. In some cases, the network entity 105-*c* may set the precoding matrix, V, to an identity matrix and compute an estimated downlink gain factor based on Equation 3. The network entity 105-*b* may select the precoding matrix, V, based on computing the estimated downlink gain factor and Equation 4. In some examples, at 420, the network entity 105-*c* outputs one or more reference signals to the repeater device 210-*b*. The network entity 105-*c* may output the one or more reference signals in accordance with the precoding matrix.

At 425, the repeater device 210-*b* may calculate a downlink gain factor based on the one or more reference signals. In some examples, the repeater device 210-*b* calculates the downlink gain factor based on interference associated with one or more wireless devices (e.g., the repeater device 210-*b* may reduce interference from the one or more wireless devices). In some cases, at 430, the repeater device 210-*b* outputs an indication of the downlink gain factor to the network entity 105-*c* based on the downlink gain factor, the one or more reference signals, or both.

In some examples, a relationship between the uplink gain factor and the downlink gain factor may be based on a product of a first value and an identity matrix. In some cases, the first value varies over a duration. Additionally, or alternatively, the uplink gain factor and the downlink gain factor may each satisfy a respective threshold based at least in part on a first quantity of power associated with each respective antenna of a set of antennas of the repeater device 210-*a*, a second quantity of power associated with the set of antennas, or both. In some examples, the uplink gain factor and the downlink gain factor each satisfy a respective threshold associated with a channel reciprocity.

At 435, the network entity 105-*c* may select a channel rank and a MCS based on the uplink gain factor, the downlink gain factor, the precoding matrix, or any combination thereof. At 440, the network entity 105-*c* may output downlink signaling according to the channel rank and the MCS. At 445, the repeater device 210-*b* may forward the downlink signaling to the UE 115-*c*.

Figure 5:
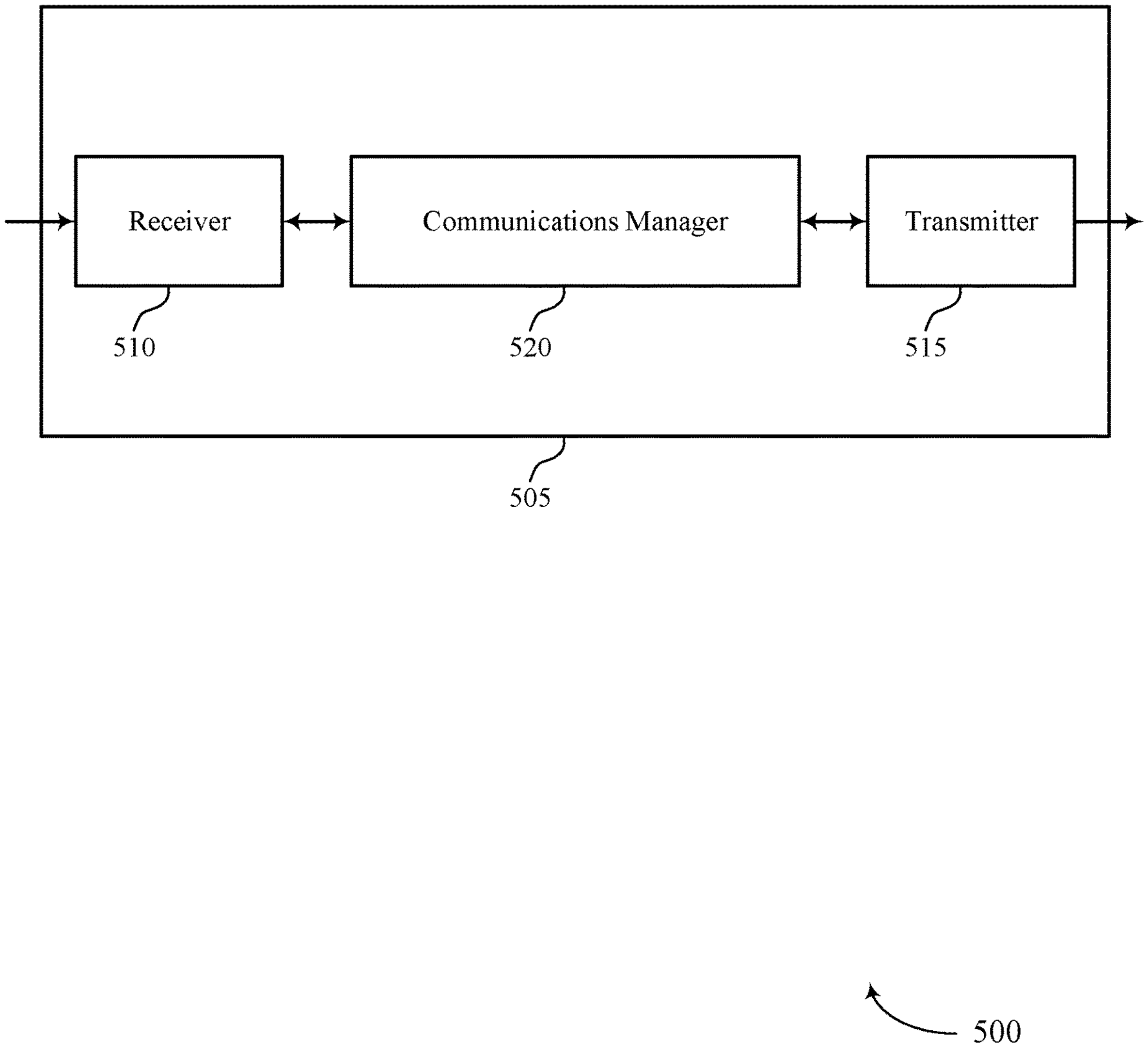
FIGS. 5 and 6 show block diagrams of devices that support using SRS for repeater downlink channel sounding in accordance with one or more aspects of the present disclosure.

FIG. 5 shows a block diagram 500 of a device 505 that supports using SRS for repeater downlink channel sounding in accordance with one or more aspects of the present disclosure. The device 505 may be an example of aspects of a network entity 105 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of using SRS for repeater downlink channel sounding as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for obtaining, from a repeater device, an indication of an uplink gain factor associated with uplink transmissions from a UE via the repeater device. The communications manager 520 is capable of, configured to, or operable to support a means for outputting downlink signaling to the UE via the repeater device according to a precoding matrix associated with downlink transmissions to the UE via the repeater device, a channel rank, and a MCS, where the precoding matrix is selected according to the uplink gain factor, and where the channel rank and the MCS are selected according to the uplink gain factor, a downlink gain factor, and the precoding matrix.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing, reduced power consumption, and more efficient utilization of communication resources.

Figure 6:
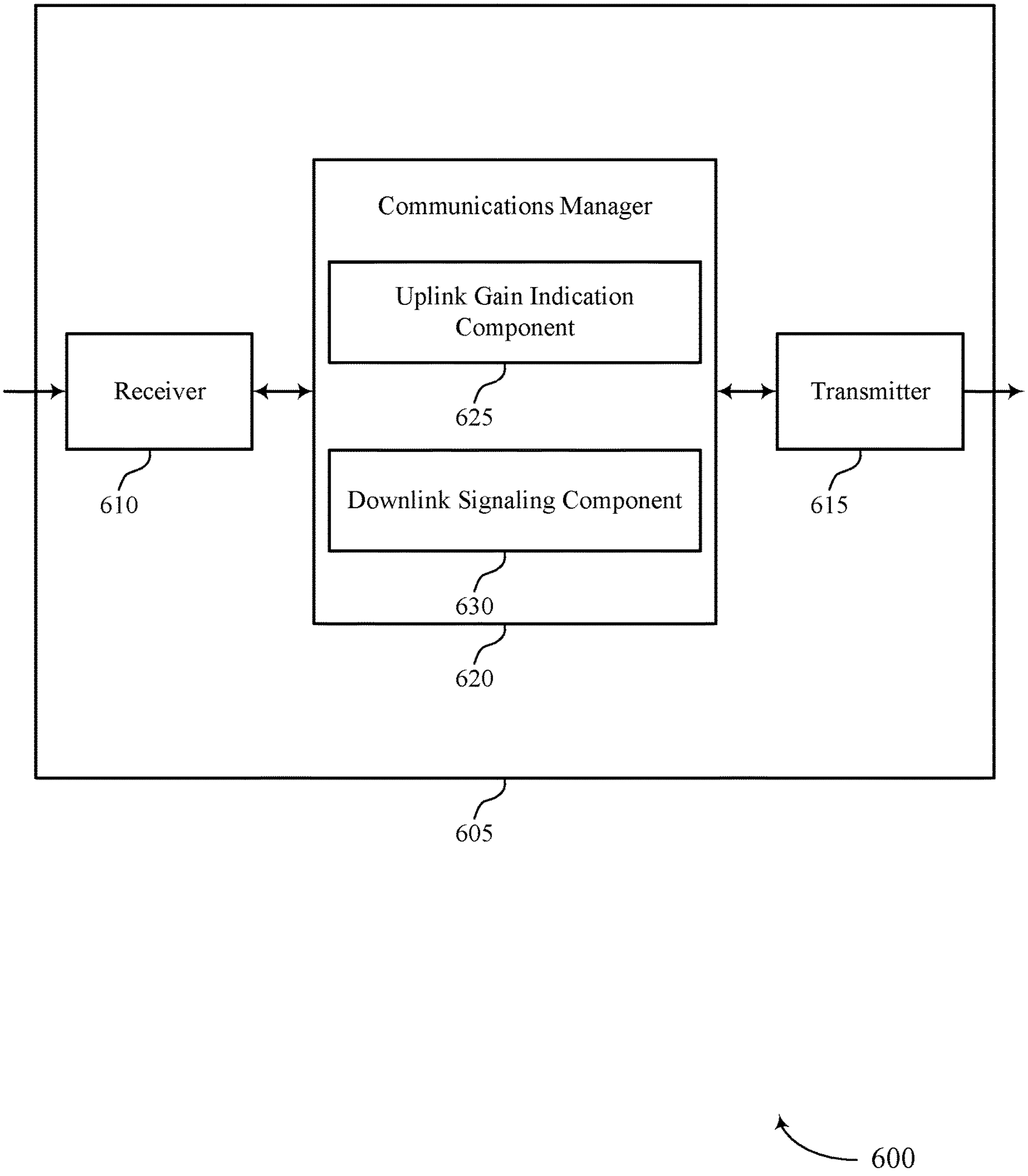

FIG. 6 shows a block diagram 600 of a device 605 that supports using SRS for repeater downlink channel sounding in accordance with one or more aspects of the present disclosure. The device 605 may be an example of aspects of a device 505 or a network entity 105 as described herein. The device 605 may include a receiver 610, a transmitter 615, and a communications manager 620. The device 605, or one of more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of using SRS for repeater downlink channel sounding as described herein. For example, the communications manager 620 may include an uplink gain indication component 625 a downlink signaling component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The uplink gain indication component 625 is capable of, configured to, or operable to support a means for obtaining, from a repeater device, an indication of an uplink gain factor associated with uplink transmissions from a UE via the repeater device. The downlink signaling component 630 is capable of, configured to, or operable to support a means for outputting downlink signaling to the UE via the repeater device according to a precoding matrix associated with downlink transmissions to the UE via the repeater device, a channel rank, and a MCS, where the precoding matrix is selected according to the uplink gain factor, and where the channel rank and the MCS are selected according to the uplink gain factor, a downlink gain factor, and the precoding matrix.

Figure 7:
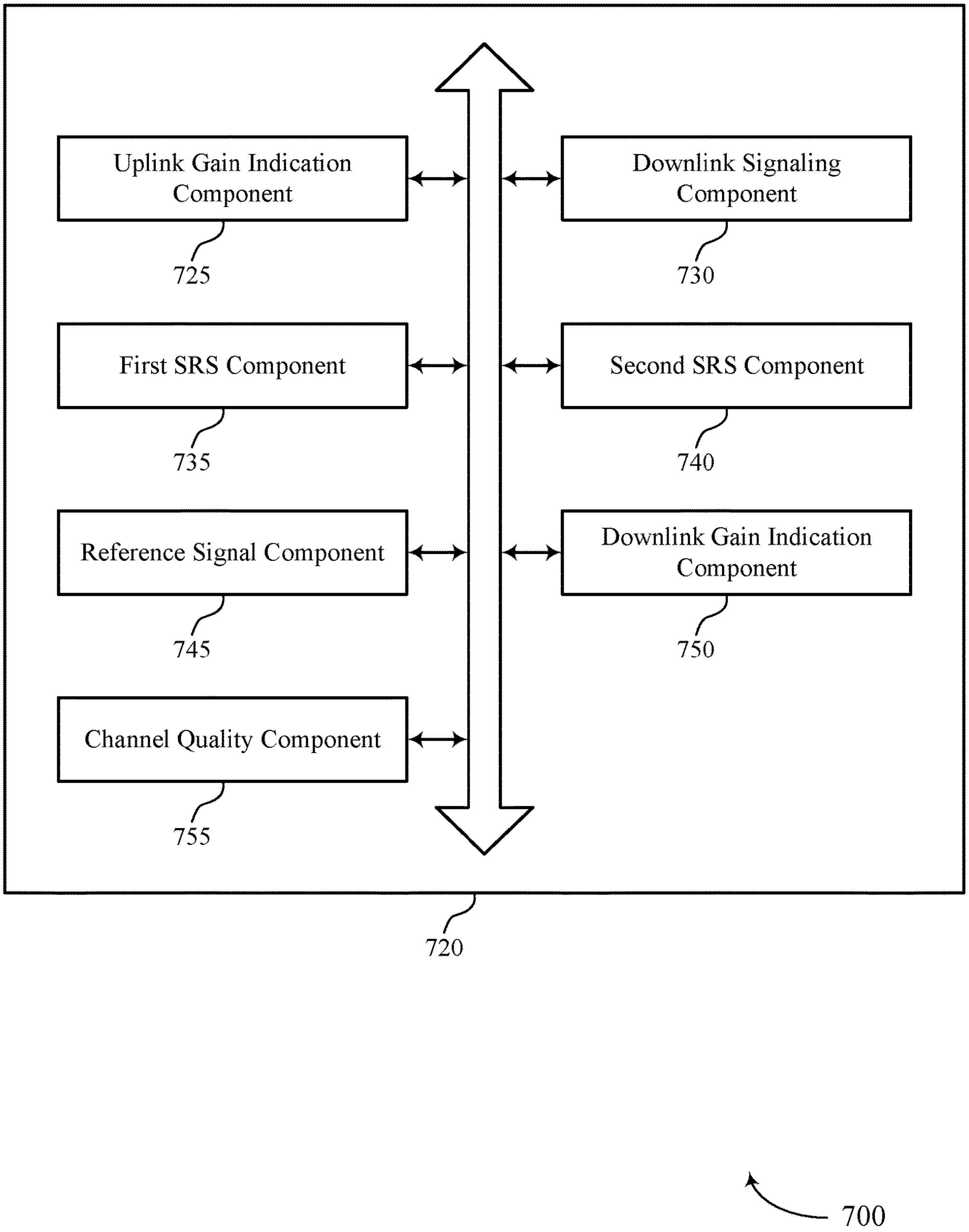
FIG. 7 shows a block diagram of a communications manager that supports using SRS for repeater downlink channel sounding in accordance with one or more aspects of the present disclosure.

FIG. 7 shows a block diagram 700 of a communications manager 720 that supports using SRS for repeater downlink channel sounding in accordance with one or more aspects of the present disclosure. The communications manager 720 may be an example of aspects of a communications manager 520, a communications manager 620, or both, as described herein. The communications manager 720, or various components thereof, may be an example of means for performing various aspects of using SRS for repeater downlink channel sounding as described herein. For example, the communications manager 720 may include an uplink gain indication component 725, a downlink signaling component 730, a first SRS component 735, a second SRS component 740, a reference signal component 745, a downlink gain indication component 750, a channel quality component 755, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications in accordance with examples as disclosed herein. The uplink gain indication component 725 is capable of, configured to, or operable to support a means for obtaining, from a repeater device, an indication of an uplink gain factor associated with uplink transmissions from a UE via the repeater device. The downlink signaling component 730 is capable of, configured to, or operable to support a means for outputting downlink signaling to the UE via the repeater device according to a precoding matrix associated with downlink transmissions to the UE via the repeater device, a channel rank, and a MCS, where the precoding matrix is selected according to the uplink gain factor, and where the channel rank and the MCS are selected according to the uplink gain factor, a downlink gain factor, and the precoding matrix.

In some examples, the first SRS component 735 is capable of, configured to, or operable to support a means for obtaining one or more first sounding reference signals associated with the UE via the repeater device. In some examples, the second SRS component 740 is capable of, configured to, or operable to support a means for obtaining one or more second sounding reference signals associated with the repeater device, where the downlink gain factor is based on the one or more first sounding reference signals and the one or more second sounding reference signals.

In some examples, the channel quality component 755 is capable of, configured to, or operable to support a means for estimating a channel quality between the network entity and the repeater device based on the one or more second sounding reference signals, where the downlink gain factor is further based on the estimated channel quality.

In some examples, selecting the precoding matrix is further based on the downlink gain factor. In some examples, selecting the channel rank and the MCS is based on an updated downlink gain factor, the updated downlink gain factor based on the precoding matrix. In some examples, selecting the channel rank and the MCS is based on an updated precoding matrix. In some examples, the updated precoding matrix is selected based on the downlink gain factor.

In some examples, the reference signal component 745 is capable of, configured to, or operable to support a means for outputting one or more reference signals to the repeater device. In some examples, the downlink gain indication component 750 is capable of, configured to, or operable to support a means for obtaining an indication of the downlink gain factor from the repeater device based on outputting the one or more reference signals.

In some examples, the one or more reference signals are output in accordance with the precoding matrix. In some examples, a relationship between the uplink gain factor and the downlink gain factor is based on a product of a first value and an identity matrix. In some examples, the first value varies over time.

Figure 8:
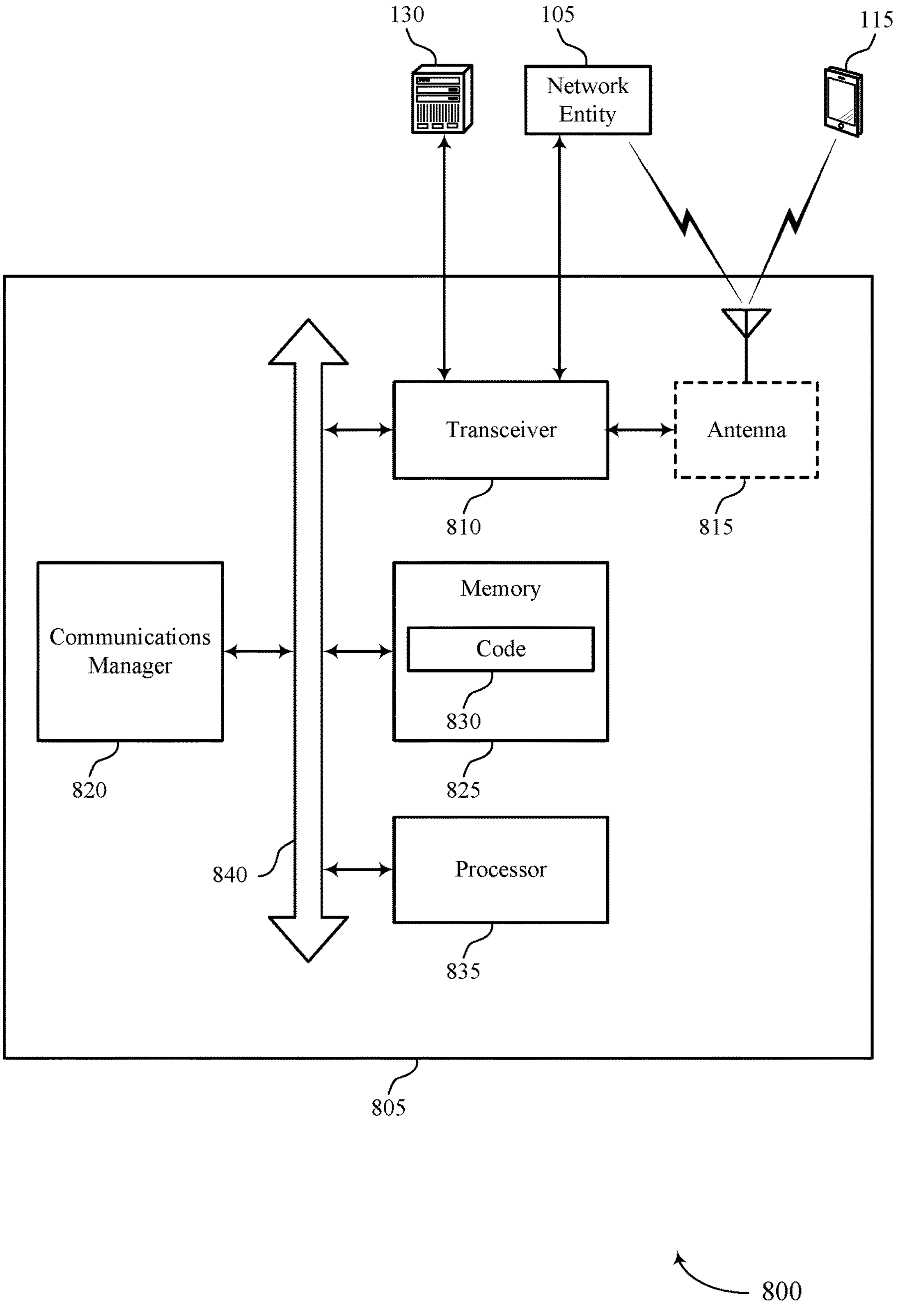
FIG. 8 shows a diagram of a system including a device that supports using SRS for repeater downlink channel sounding in accordance with one or more aspects of the present disclosure.

FIG. 8 shows a diagram of a system 800 including a device 805 that supports using SRS for repeater downlink channel sounding in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, at least one memory 825, code 830, and at least one processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or one or more memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or one or more memory components (e.g., the at least one processor 835, the at least one memory 825, or both), may be included in a chip or chip assembly that is installed in the device 805. In some examples, the transceiver 810 may be operable to support communications via one or more communications links (e.g., a communication link 125, a backhaul communication link 120, a midhaul communication link 162, a fronthaul communication link 168).

The at least one memory 825 may include RAM, ROM, or any combination thereof. The at least one memory 825 may store computer-readable, computer-executable code 830 including instructions that, when executed by one or more of the at least one processor 835, cause the device 805 to perform various functions described herein. The code 830 may be stored in a non-transitory computer-readable medium such as system memory or another type of memory. In some cases, the code 830 may not be directly executable by a processor of the at least one processor 835 but may cause a computer (e.g., when compiled and executed) to perform functions described herein. In some cases, the at least one memory 825 may contain, among other things, a BIOS which may control basic hardware or software operation such as the interaction with peripheral components or devices. In some examples, the at least one processor 835 may include multiple processors and the at least one memory 825 may include multiple memories. One or more of the multiple processors may be coupled with one or more of the multiple memories which may, individually or collectively, be configured to perform various functions herein (for example, as part of a processing system).

The at least one processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 835 may be configured to operate a memory array using a memory controller. In some other cases, a memory controller may be integrated into one or more of the at least one processor 835. The at least one processor 835 may be configured to execute computer-readable instructions stored in a memory (e.g., one or more of the at least one memory 825) to cause the device 805 to perform various functions (e.g., functions or tasks supporting using SRS for repeater downlink channel sounding). For example, the device 805 or a component of the device 805 may include at least one processor 835 and at least one memory 825 coupled with one or more of the at least one processor 835, the at least one processor 835 and the at least one memory 825 configured to perform various functions described herein. The at least one processor 835 may be an example of a cloud-computing platform (e.g., one or more physical nodes and supporting software such as operating systems, virtual machines, or container instances) that may host the functions (e.g., by executing code 830) to perform the functions of the device 805. The at least one processor 835 may be any one or more suitable processors capable of executing scripts or instructions of one or more software programs stored in the device 805 (such as within one or more of the at least one memory 825). In some examples, the at least one processor 835 may include multiple processors and the at least one memory 825 may include multiple memories. One or more of the multiple processors may be coupled with one or more of the multiple memories, which may, individually or collectively, be configured to perform various functions herein.

In some examples, the at least one processor 835 may be a component of a processing system, which may refer to a system (such as a series) of machines, circuitry (including, for example, one or both of processor circuitry (which may include the at least one processor 835) and memory circuitry (which may include the at least one memory 825)), or components, that receives or obtains inputs and processes the inputs to produce, generate, or obtain a set of outputs. The processing system may be configured to perform one or more of the functions described herein. For example, the at least one processor 835 or a processing system including the at least one processor 835 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 825 or otherwise, to perform one or more of the functions described herein.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the at least one memory 825, the code 830, and the at least one processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communications in accordance with examples as disclosed herein. For example, the communications manager 820 is capable of, configured to, or operable to support a means for obtaining, from a repeater device, an indication of an uplink gain factor associated with uplink transmissions from a UE via the repeater device. The communications manager 820 is capable of, configured to, or operable to support a means for outputting downlink signaling to the UE via the repeater device according to a precoding matrix associated with downlink transmissions to the UE via the repeater device, a channel rank, and a MCS, where the precoding matrix is selected according to the uplink gain factor, and where the channel rank and the MCS are selected according to the uplink gain factor, a downlink gain factor, and the precoding matrix.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, one or more of the at least one processor 835, one or more of the at least one memory 825, the code 830, or any combination thereof (for example, by a processing system including at least a portion of the at least one processor 835, the at least one memory 825, the code 830, or any combination thereof). For example, the code 830 may include instructions executable by one or more of the at least one processor 835 to cause the device 805 to perform various aspects of using SRS for repeater downlink channel sounding as described herein, or the at least one processor 835 and the at least one memory 825 may be otherwise configured to, individually or collectively, perform or support such operations.

Figure 9:
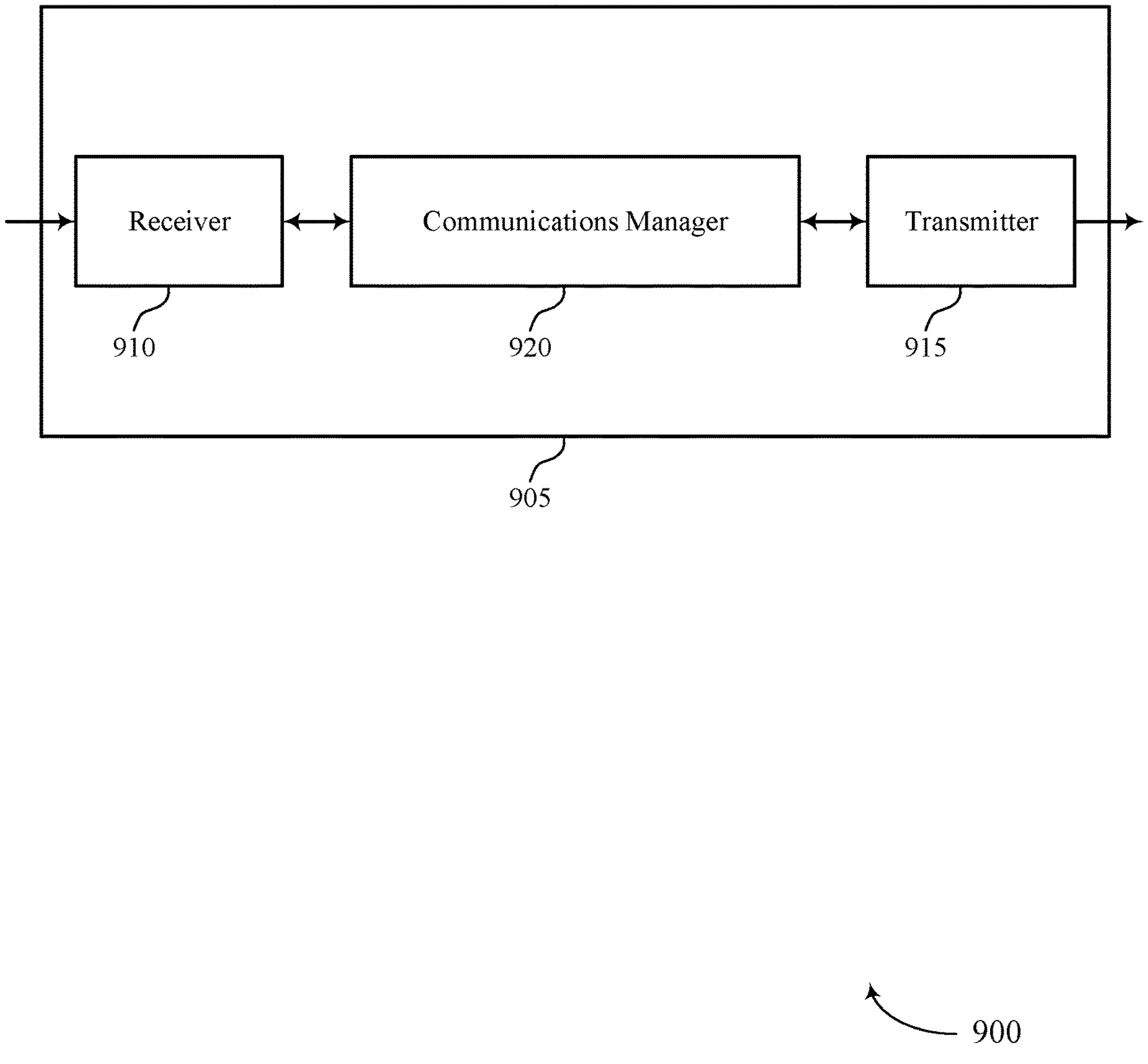
FIGS. 9 and 10 show block diagrams of devices that support using SRS for repeater downlink channel sounding in accordance with one or more aspects of the present disclosure.

FIG. 9 shows a block diagram 900 of a device 905 that supports using SRS for repeater downlink channel sounding in accordance with one or more aspects of the present disclosure. The device 905 may be an example of aspects of a repeater device as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of using SRS for repeater downlink channel sounding as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for outputting, to a network entity, an indication of an uplink gain factor associated with uplink transmissions from a UE. The communications manager 920 is capable of, configured to, or operable to support a means for obtaining downlink signaling according to a channel rank and a MCS corresponding to the uplink gain factor and a downlink gain factor. The communications manager 920 is capable of, configured to, or operable to support a means for forwarding the downlink signaling to the UE.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing, reduced power consumption, and more efficient utilization of communication resources.

Figure 10:
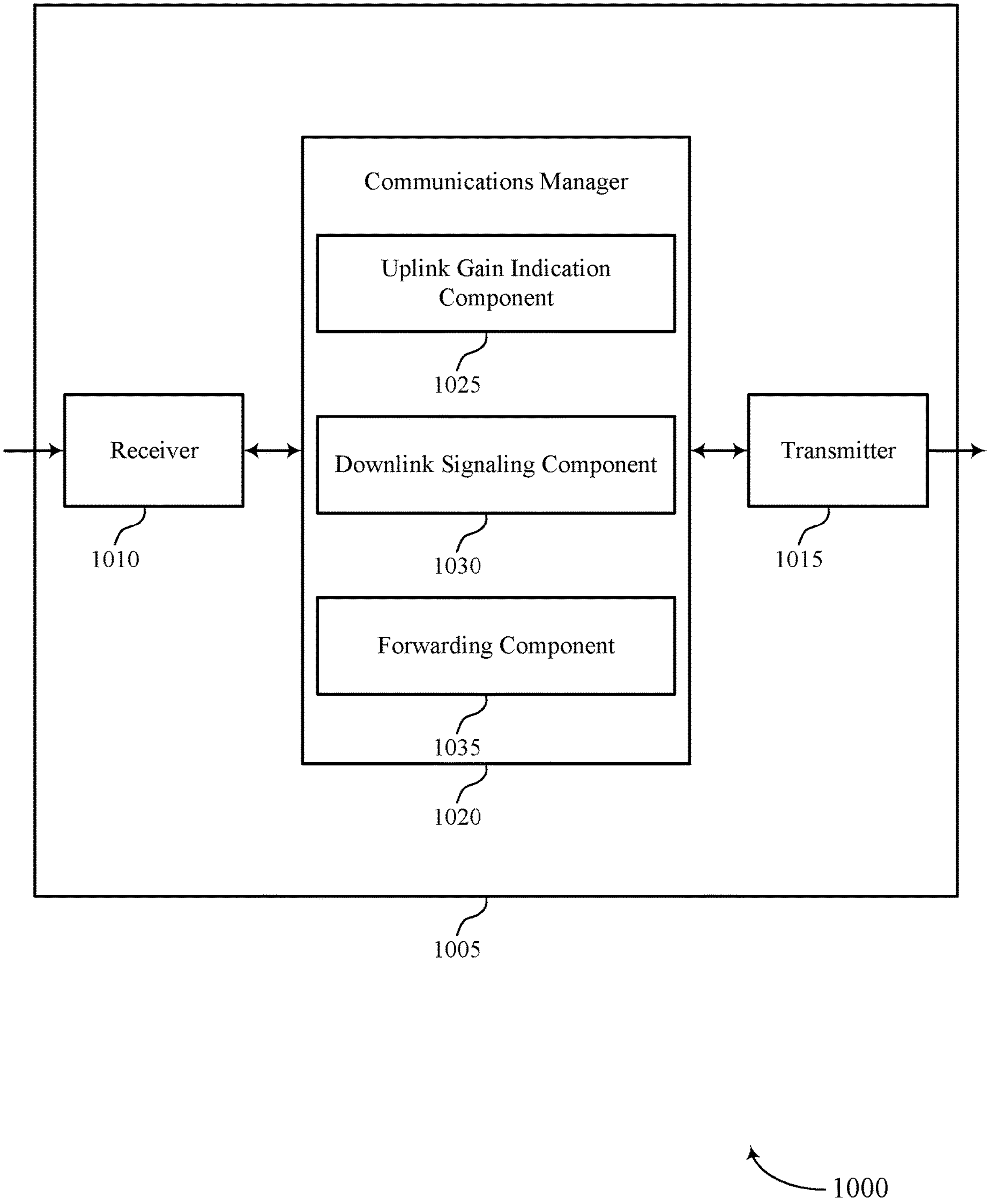

FIG. 10 shows a block diagram 1000 of a device 1005 that supports using SRS for repeater downlink channel sounding in accordance with one or more aspects of the present disclosure. The device 1005 may be an example of aspects of a device 905 or a repeater device 210 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of using SRS for repeater downlink channel sounding as described herein. For example, the communications manager 1020 may include an uplink gain indication component 1025, a downlink signaling component 1030, a forwarding component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The uplink gain indication component 1025 is capable of, configured to, or operable to support a means for outputting, to a network entity, an indication of an uplink gain factor associated with uplink transmissions from a UE. The downlink signaling component 1030 is capable of, configured to, or operable to support a means for obtaining downlink signaling according to a channel rank and a MCS corresponding to the uplink gain factor and a downlink gain factor. The forwarding component 1035 is capable of, configured to, or operable to support a means for forwarding the downlink signaling to the UE.

Figure 11:
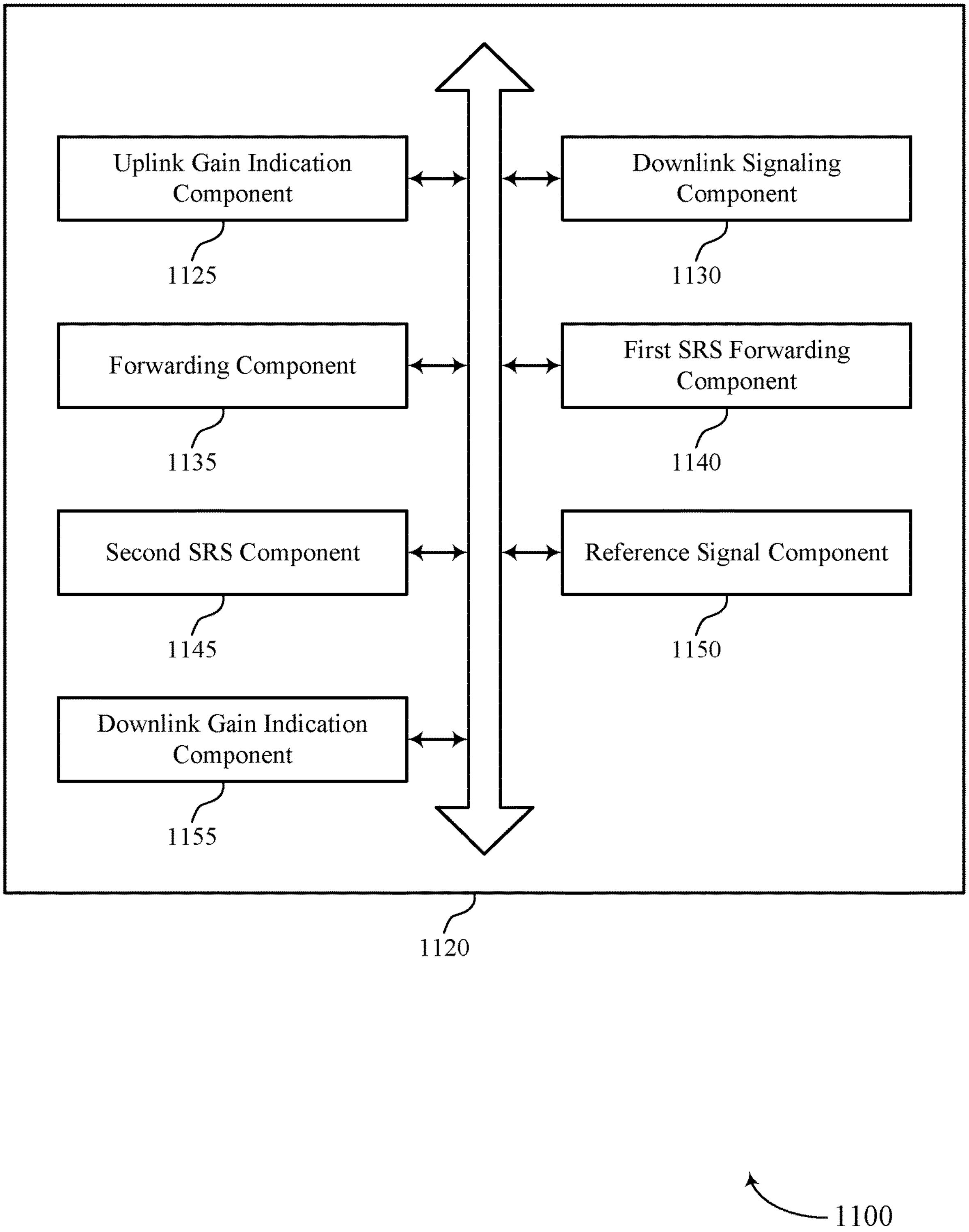
FIG. 11 shows a block diagram of a communications manager that supports using SRS for repeater downlink channel sounding in accordance with one or more aspects of the present disclosure.

FIG. 11 shows a block diagram 1100 of a communications manager 1120 that supports using SRS for repeater downlink channel sounding in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of using SRS for repeater downlink channel sounding as described herein. For example, the communications manager 1120 may include an uplink gain indication component 1125, a downlink signaling component 1130, a forwarding component 1135, a first SRS forwarding component 1140, a second SRS component 1145, a reference signal component 1150, a downlink gain indication component 1155, or any combination thereof. Each of these components, or components or subcomponents thereof (e.g., one or more processors, one or more memories), may communicate, directly or indirectly, with one another (e.g., via one or more buses).

The communications manager 1120 may support wireless communications in accordance with examples as disclosed herein. The uplink gain indication component 1125 is capable of, configured to, or operable to support a means for outputting, to a network entity, an indication of an uplink gain factor associated with uplink transmissions from a UE. The downlink signaling component 1130 is capable of, configured to, or operable to support a means for obtaining downlink signaling according to a channel rank and a MCS corresponding to the uplink gain factor and a downlink gain factor. The forwarding component 1135 is capable of, configured to, or operable to support a means for forwarding the downlink signaling to the UE.

In some examples, the first SRS forwarding component 1140 is capable of, configured to, or operable to support a means for forwarding, to the network entity, one or more first sounding reference signals associated with the UE. In some examples, the second SRS component 1145 is capable of, configured to, or operable to support a means for outputting, to the network entity, one or more second sounding reference signals associated with the repeater device, where the downlink signaling is based on the one or more first sounding reference signals and the one or more second sounding reference signals.

In some examples, the reference signal component 1150 is capable of, configured to, or operable to support a means for obtaining one or more downlink reference signals. In some examples, the downlink gain indication component 1155 is capable of, configured to, or operable to support a means for outputting an indication of the downlink gain factor to the network entity, where the downlink gain factor is based on the one or more downlink reference signals, and where the downlink signaling is based on the downlink gain factor.

In some examples, the downlink gain factor is based on interference associated with one or more wireless devices. In some examples, the uplink gain factor and the downlink gain factor each satisfy a respective threshold based on a first quantity of power associated with each respective antenna of a set of antennas of the repeater device or a second quantity of power associated with of the set of antennas.

In some examples, the uplink gain factor and the downlink gain factor each satisfy a respective threshold associated with a channel reciprocity. In some examples, a relationship between the uplink gain factor and the downlink gain factor is based on a product of a first value and an identity matrix. In some examples, the first value varies over time.

Figure 12:
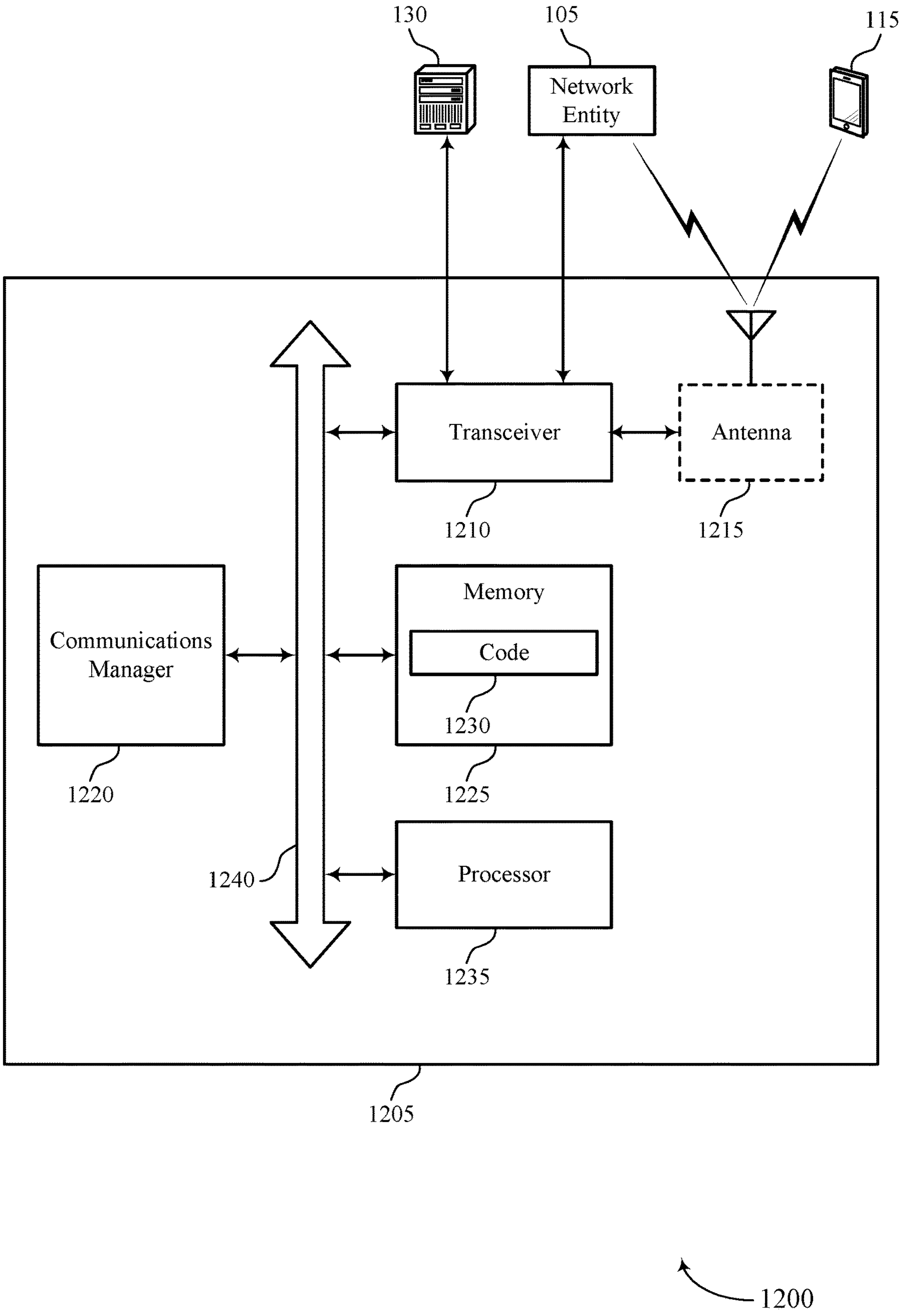
FIG. 12 shows a diagram of a system including a device that supports using SRS for repeater downlink channel sounding in accordance with one or more aspects of the present disclosure.

FIG. 12 shows a diagram of a system 1200 including a device 1205 that supports using SRS for repeater downlink channel sounding in accordance with one or more aspects of the present disclosure. The device 1205 may be an example of or include the components of a device 905, a device 1005, or a repeater device as described herein. The device 1205 may include components for bi-directional voice and data communications including components for transmitting and receiving communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting using SRS for repeater downlink channel sounding). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein.

In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for outputting, to a network entity, an indication of an uplink gain factor associated with uplink transmissions from a UE. The communications manager 1220 is capable of, configured to, or operable to support a means for obtaining downlink signaling according to a channel rank and a MCS corresponding to the uplink gain factor and a downlink gain factor. The communications manager 1220 is capable of, configured to, or operable to support a means for forwarding the downlink signaling to the UE.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of using SRS for repeater downlink channel sounding as described herein, or the at least one processor 1235 and the at least one memory 1225 may be otherwise configured to, individually or collectively, perform or support such operations.

Figure 13:
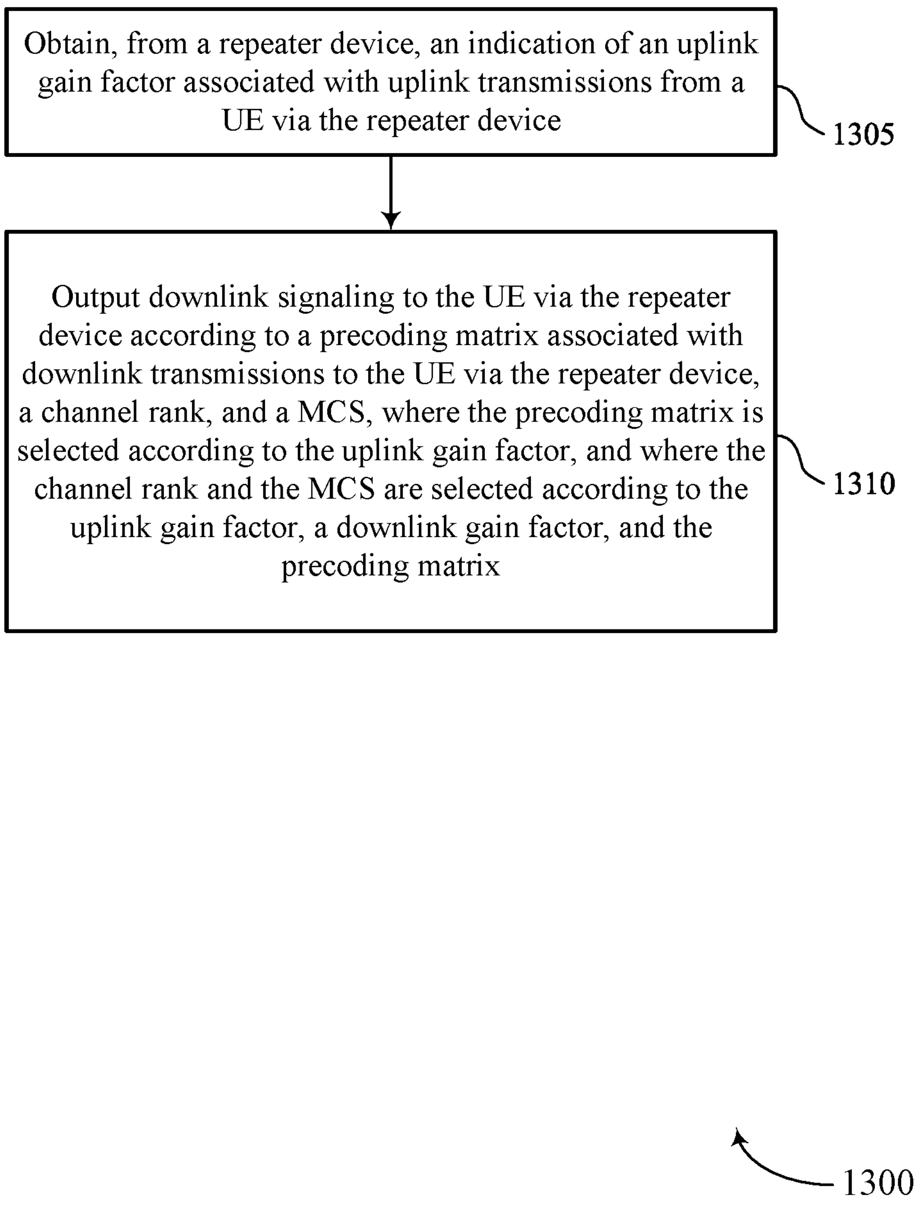
FIGS. 13 through 16 show flowcharts illustrating methods that support using SRS for repeater downlink channel sounding in accordance with one or more aspects of the present disclosure.

FIG. 13 shows a flowchart illustrating a method 1300 that supports using SRS for repeater downlink channel sounding in accordance with aspects of the present disclosure. The operations of the method 1300 may be implemented by a network entity or its components as described herein. For example, the operations of the method 1300 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1305, the method may include obtaining, from a repeater device, an indication of an uplink gain factor associated with uplink transmissions from a UE via the repeater device. The operations of block 1305 may be performed in accordance with examples as disclosed herein. In some examples, aspects of the operations of 1305 may be performed by an uplink gain indication component 725 as described with reference to FIG. 7.

At 1310, the method may include outputting downlink signaling to the UE via the repeater device according to a precoding matrix associated with downlink transmissions to the UE via the repeater device, a channel rank, and a MCS, where the precoding matrix is selected according to the uplink gain factor, and where the channel rank and the MCS are selected according to the uplink gain factor, a downlink gain factor, and the precoding matrix. The operations of block 1310 may be performed in accordance with examples as disclosed herein. In some examples, aspects of the operations of 1310 may be performed by a downlink signaling component 730 as described with reference to FIG. 7.

Figure 14:
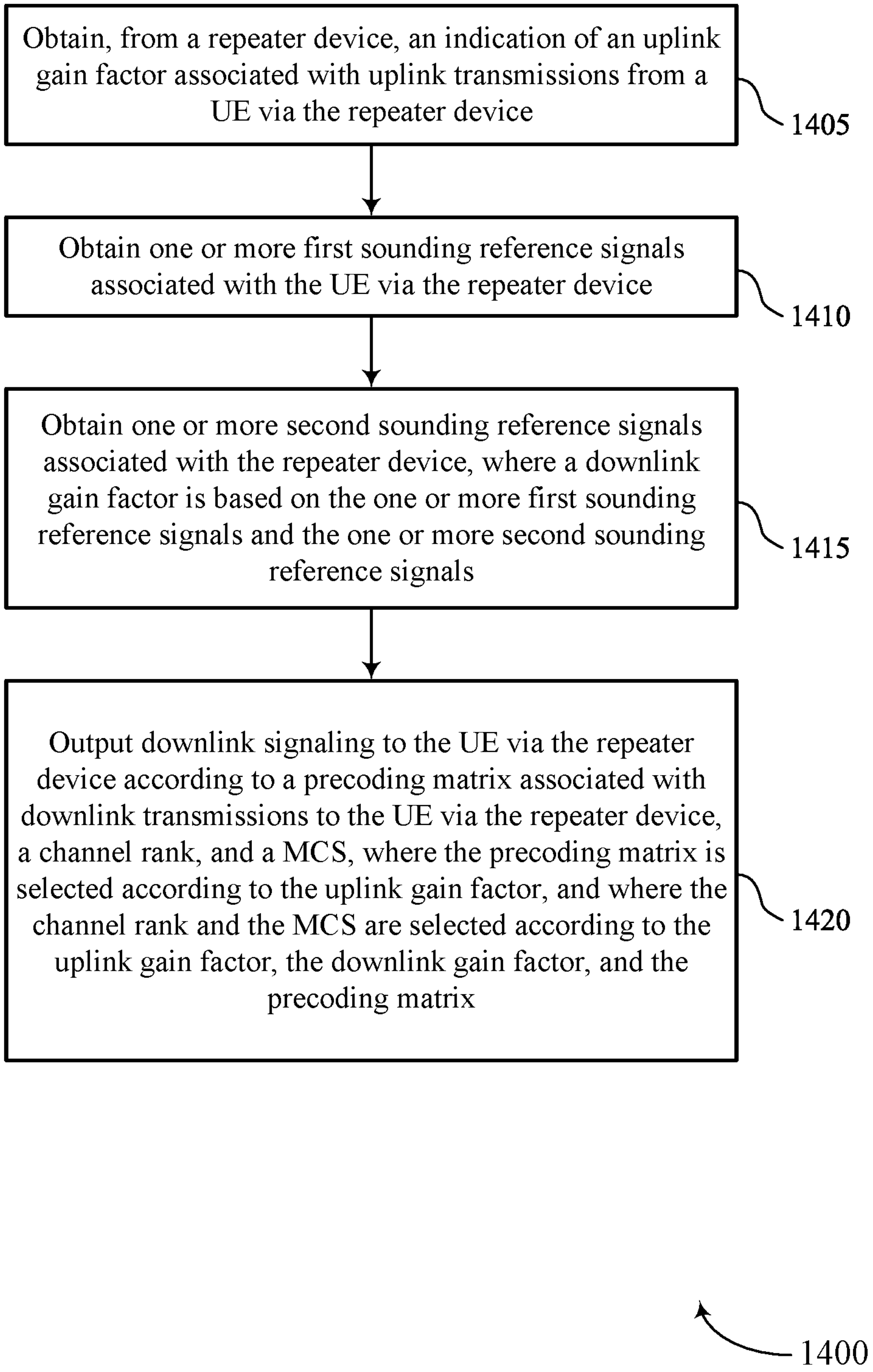

FIG. 14 shows a flowchart illustrating a method 1400 that supports using SRS for repeater downlink channel sounding in accordance with aspects of the present disclosure. The operations of the method 1400 may be implemented by a network entity or its components as described herein. For example, the operations of the method 1400 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1405, the method may include obtaining, from a repeater device, an indication of an uplink gain factor associated with uplink transmissions from a UE via the repeater device. The operations of block 1405 may be performed in accordance with examples as disclosed herein. In some examples, aspects of the operations of 1405 may be performed by an uplink gain indication component 725 as described with reference to FIG. 7.

At 1410, the method may include obtaining one or more first sounding reference signals associated with the UE via the repeater device. The operations of block 1410 may be performed in accordance with examples as disclosed herein. In some examples, aspects of the operations of 1410 may be performed by a first SRS component 735 as described with reference to FIG. 7.

At 1415, the method may include obtaining one or more second sounding reference signals associated with the repeater device, where a downlink gain factor is based on the one or more first sounding reference signals and the one or more second sounding reference signals. The operations of block 1415 may be performed in accordance with examples as disclosed herein. In some examples, aspects of the operations of 1415 may be performed by a second SRS component 740 as described with reference to FIG. 7.

At 1420, the method may include outputting downlink signaling to the UE via the repeater device according to a precoding matrix associated with downlink transmissions to the UE via the repeater device, a channel rank, and a MCS, where the precoding matrix is selected according to the uplink gain factor, and where the channel rank and the MCS are selected according to the uplink gain factor, the downlink gain factor, and the precoding matrix. The operations of block 1420 may be performed in accordance with examples as disclosed herein. In some examples, aspects of the operations of 1420 may be performed by a downlink signaling component 730 as described with reference to FIG. 7.

Figure 15:
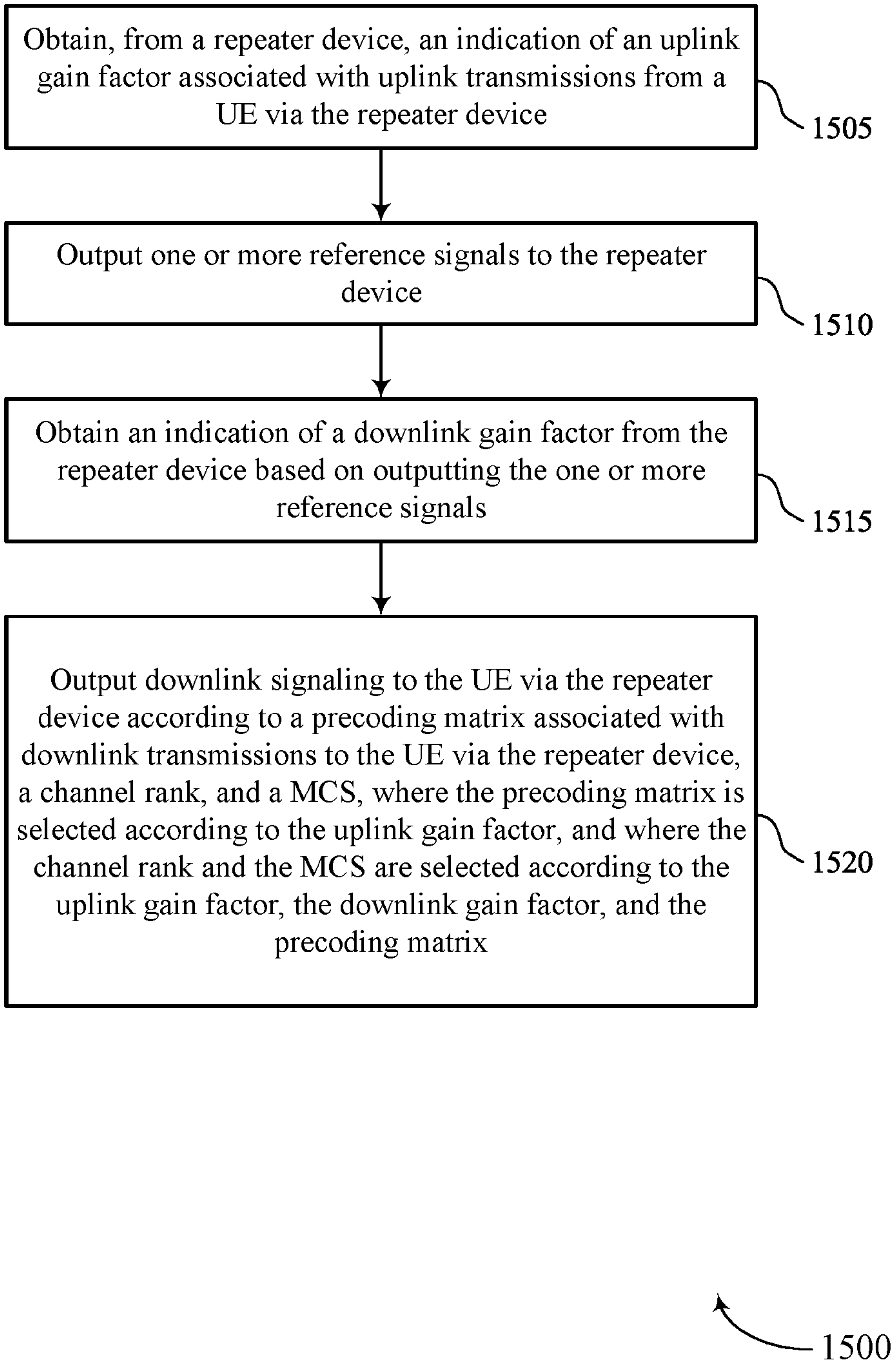

FIG. 15 shows a flowchart illustrating a method 1500 that supports using SRS for repeater downlink channel sounding in accordance with aspects of the present disclosure. The operations of the method 1500 may be implemented by a network entity or its components as described herein. For example, the operations of the method 1500 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1505, the method may include obtaining, from a repeater device, an indication of an uplink gain factor associated with uplink transmissions from a UE via the repeater device. The operations of block 1505 may be performed in accordance with examples as disclosed herein. In some examples, aspects of the operations of 1505 may be performed by an uplink gain indication component 725 as described with reference to FIG. 7.

At 1510, the method may include outputting one or more reference signals to the repeater device. The operations of block 1510 may be performed in accordance with examples as disclosed herein. In some examples, aspects of the operations of 1510 may be performed by a reference signal component 745 as described with reference to FIG. 7.

At 1515, the method may include obtaining an indication of a downlink gain factor from the repeater device based on outputting the one or more reference signals. The operations of block 1515 may be performed in accordance with examples as disclosed herein. In some examples, aspects of the operations of 1515 may be performed by a downlink gain indication component 750 as described with reference to FIG. 7.

At 1520, the method may include outputting downlink signaling to the UE via the repeater device according to a precoding matrix associated with downlink transmissions to the UE via the repeater device, a channel rank, and a MCS, where the precoding matrix is selected according to the uplink gain factor, and where the channel rank and the MCS are selected according to the uplink gain factor, the downlink gain factor, and the precoding matrix. The operations of block 1520 may be performed in accordance with examples as disclosed herein. In some examples, aspects of the operations of 1520 may be performed by a downlink signaling component 730 as described with reference to FIG. 7.

Figure 16:
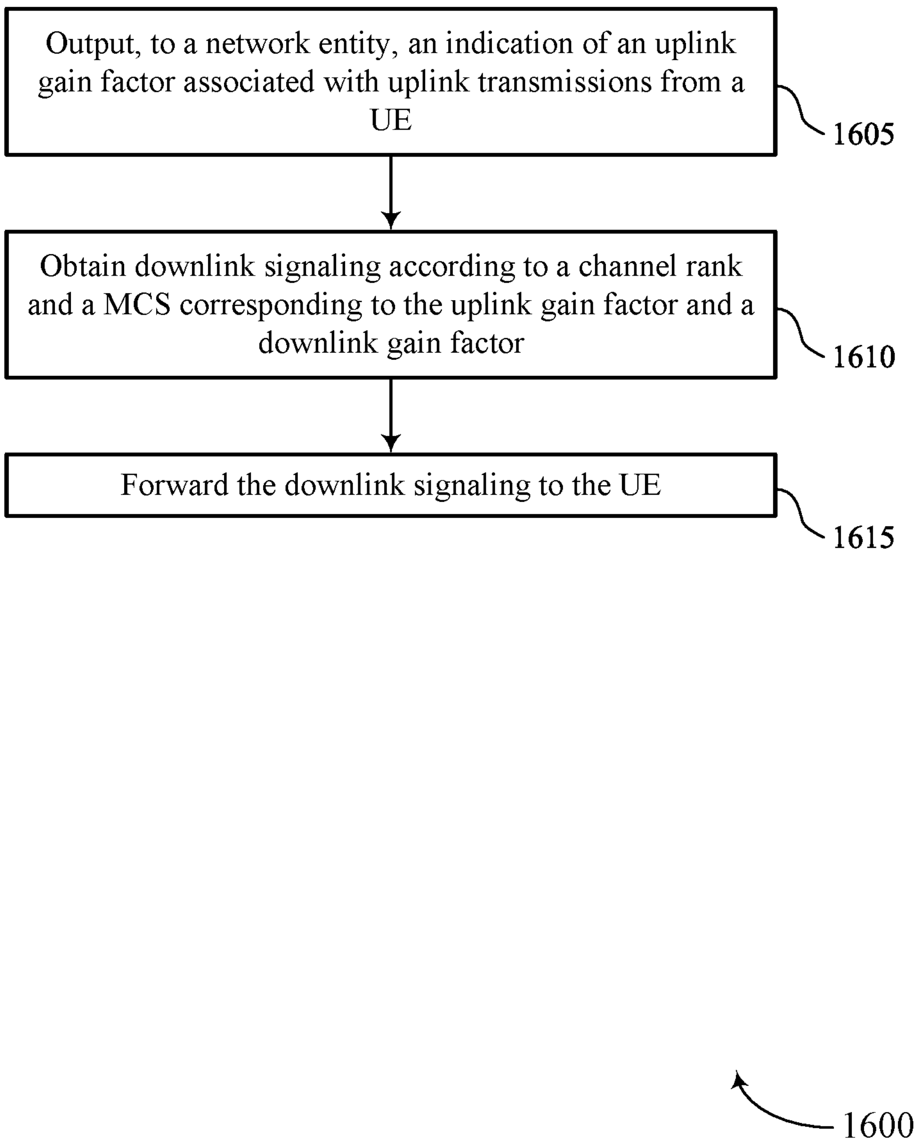

FIG. 16 shows a flowchart illustrating a method 1600 that supports using SRS for repeater downlink channel sounding in accordance with aspects of the present disclosure. The operations of the method 1600 may be implemented by a repeater device or its components as described herein. For example, the operations of the method 1600 may be performed by a repeater device as described with reference to FIGS. 1 through 4 and 9 through 12. In some examples, a repeater device may execute a set of instructions to control the functional elements of the repeater device to perform the described functions. Additionally, or alternatively, the repeater device may perform aspects of the described functions using special-purpose hardware.

At 1605, the method may include outputting, to a network entity, an indication of an uplink gain factor associated with uplink transmissions from a UE. The operations of block 1605 may be performed in accordance with examples as disclosed herein. In some examples, aspects of the operations of 1605 may be performed by an uplink gain indication component 1125 as described with reference to FIG. 11.

At 1610, the method may include obtaining downlink signaling according to a channel rank and a MCS corresponding to the uplink gain factor and a downlink gain factor. The operations of block 1610 may be performed in accordance with examples as disclosed herein. In some examples, aspects of the operations of 1610 may be performed by a downlink signaling component 1130 as described with reference to FIG. 11.

At 1615, the method may include forwarding the downlink signaling to the UE. The operations of block 1615 may be performed in accordance with examples as disclosed herein. In some examples, aspects of the operations of 1615 may be performed by a forwarding component 1135 as described with reference to FIG. 11.

The following provides an overview of aspects of the present disclosure:

Aspect 1: A method for wireless communications at a network entity, comprising: obtaining, from a repeater device, an indication of an uplink gain factor associated with uplink transmissions from a UE via the repeater device; and outputting downlink signaling to the UE via the repeater device according to a precoding matrix associated with downlink transmissions to the UE via the repeater device, a channel rank, and a MCS, wherein the precoding matrix is selected according to the uplink gain factor, and wherein the channel rank and the MCS are selected according to the uplink gain factor, a downlink gain factor, and the precoding matrix.

Aspect 2: The method of aspect 1, further comprising: obtaining one or more first SRS associated with the UE via the repeater device; and obtaining one or more second SRS associated with the repeater device, wherein the downlink gain factor is based at least in part on the one or more first SRS and the one or more second SRS.

Aspect 3: The method of aspect 2, further comprising: estimating a channel quality between the network entity and the repeater device based at least in part on the one or more second SRS, wherein the downlink gain factor is further based at least in part on the estimated channel quality.

Aspect 4: The method of any of aspects 2 through 3, wherein selecting the precoding matrix is further based at least in part on the downlink gain factor.

Aspect 5: The method of aspect 4, wherein selecting the channel rank and the MCS is based at least in part on an updated downlink gain factor, the updated downlink gain factor based at least in part on the precoding matrix.

Aspect 6: The method of any of aspects 2 through 5, wherein selecting the channel rank and the MCS is based at least in part on an updated precoding matrix, the updated precoding matrix is selected based at least in part on the downlink gain factor.

Aspect 7: The method of aspect 1, further comprising: outputting one or more reference signals to the repeater device; and obtaining an indication of the downlink gain factor from the repeater device based at least in part on outputting the one or more reference signals.

Aspect 8: The method of aspect 7, wherein the one or more reference signals are output in accordance with the precoding matrix.

Aspect 9: The method of any of aspects 1 through 8, wherein a relationship between the uplink gain factor and the downlink gain factor is based at least in part on a product of a first value and an identity matrix.

Aspect 10: The method of aspect 9, wherein the first value varies over time.

Aspect 11: A method for wireless communications at a repeater device, comprising: outputting, to a network entity, an indication of an uplink gain factor associated with uplink transmissions from a UE; obtaining downlink signaling according to a channel rank and a MCS corresponding to the uplink gain factor and a downlink gain factor; and forwarding the downlink signaling to the UE.

Aspect 12: The method of aspect 11, further comprising: forwarding, to the network entity, one or more first SRS associated with the UE; and outputting, to the network entity, one or more second SRS associated with the repeater device, wherein the downlink signaling is based at least in part on the one or more first SRS and the one or more second SRS.

Aspect 13: The method of aspect 11, further comprising: obtaining one or more downlink reference signals; and outputting an indication of the downlink gain factor to the network entity, wherein the downlink gain factor is based at least in part on the one or more downlink reference signals, and wherein the downlink signaling is based at least in part on the downlink gain factor.

Aspect 14: The method of aspect 13, wherein the downlink gain factor is based at least in part on interference associated with one or more wireless devices.

Aspect 15: The method of any of aspects 11 through 14, wherein the uplink gain factor and the downlink gain factor each satisfy a respective threshold based at least in part on a first quantity of power associated with each respective antenna of a set of antennas of the repeater device or a second quantity of power associated with of the set of antennas.

Aspect 16: The method of any of aspects 11 through 15, wherein the uplink gain factor and the downlink gain factor each satisfy a respective threshold associated with a channel reciprocity.

Aspect 17: The method of any of aspects 11 through 16, wherein a relationship between the uplink gain factor and the downlink gain factor is based at least in part on a product of a first value and an identity matrix.

Aspect 18: The method of aspect 17, wherein the first value varies over time.

Aspect 19: A network entity for wireless communications, comprising one or more memories storing processor-executable code, and one or more processors coupled with the one or more memories and individually or collectively operable to execute the code to cause the network entity to perform a method of any of aspects 1 through 10.

Aspect 20: A network entity for wireless communications, comprising at least one means for performing a method of any of aspects 1 through 10.

Aspect 21: A non-transitory computer-readable medium storing code for wireless communications, the code comprising instructions executable by one or more processors to perform a method of any of aspects 1 through 10.

Aspect 22: A repeater device for wireless communications, comprising one or more memories storing processor-executable code, and one or more processors coupled with the one or more memories and individually or collectively operable to execute the code to cause the repeater device to perform a method of any of aspects 11 through 18.

Aspect 23: A repeater device for wireless communications, comprising at least one means for performing a method of any of aspects 11 through 18.

Aspect 24: A non-transitory computer-readable medium storing code for wireless communications, the code comprising instructions executable by one or more processors to perform a method of any of aspects 11 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity, comprising:

one or more memories storing processor-executable code; and one or more processors coupled with the one or more memories and individually or collectively operable to execute the code to cause the network entity to:

obtain, from a repeater device, an indication of an uplink gain factor associated with uplink transmissions from a user equipment (UE) via the repeater device; and output downlink signaling to the UE via the repeater device according to a precoding matrix associated with downlink transmissions to the UE via the repeater device, a channel rank, and a modulation and coding scheme, wherein the precoding matrix is selected according to the uplink gain factor, and wherein the channel rank and the modulation and coding scheme are selected according to the uplink gain factor, a downlink gain factor, and the precoding matrix.

2. The network entity of claim 1, wherein the one or more processors are individually or collectively further operable to execute the code to cause the network entity to:

obtain one or more first sounding reference signals associated with the UE via the repeater device; and obtain one or more second sounding reference signals associated with the repeater device, wherein the downlink gain factor is based at least in part on the one or more first sounding reference signals and the one or more second sounding reference signals.

3. The network entity of claim 2, wherein the one or more processors are individually or collectively further operable to execute the code to cause the network entity to:

estimate a channel quality between the network entity and the repeater device based at least in part on the one or more second sounding reference signals, wherein the downlink gain factor is further based at least in part on the estimated channel quality.

4. The network entity of claim 2, wherein selecting the precoding matrix is further based at least in part on the downlink gain factor.

5. The network entity of claim 4, wherein selecting the channel rank and the modulation and coding scheme is based at least in part on an updated downlink gain factor, the updated downlink gain factor based at least in part on the precoding matrix.

6. The network entity of claim 2, wherein:

selecting the channel rank and the modulation and coding scheme is based at least in part on an updated precoding matrix, wherein the updated precoding matrix is selected based at least in part on the downlink gain factor.

7. The network entity of claim 1, wherein the one or more processors are individually or collectively further operable to execute the code to cause the network entity to:

output one or more reference signals to the repeater device; and obtain an indication of the downlink gain factor from the repeater device based at least in part on outputting the one or more reference signals.

8. The network entity of claim 7, wherein the one or more reference signals are output in accordance with the precoding matrix.

9. The network entity of claim 1, wherein a relationship between the uplink gain factor and the downlink gain factor is based at least in part on a product of a first value and an identity matrix.

10. The network entity of claim 9, wherein the first value varies over time.

11. A repeater device, comprising:

one or more memories storing processor-executable code; and one or more processors coupled with the one or more memories and individually or collectively operable to execute the code to cause the repeater device to:

output, to a network entity, an indication of an uplink gain factor associated with uplink transmissions from a user equipment (UE);

obtain downlink signaling according to a channel rank and a modulation and coding scheme (MCS) corresponding to the uplink gain factor and a downlink gain factor; and forward the downlink signaling to the UE.

12. The repeater device of claim 11, wherein the one or more processors are individually or collectively further operable to execute the code to cause the repeater device to:

forward, to the network entity, one or more first sounding reference signals associated with the UE; and output, to the network entity, one or more second sounding reference signals associated with the repeater device, wherein the downlink signaling is based at least in part on the one or more first sounding reference signals and the one or more second sounding reference signals.

13. The repeater device of claim 11, wherein the one or more processors are individually or collectively further operable to execute the code to cause the repeater device to:

obtain one or more downlink reference signals; and output an indication of the downlink gain factor to the network entity, wherein the downlink gain factor is based at least in part on the one or more downlink reference signals, and wherein the downlink signaling is based at least in part on the downlink gain factor.

14. The repeater device of claim 13, wherein the downlink gain factor is based at least in part on interference associated with one or more wireless devices.

15. The repeater device of claim 11, wherein the uplink gain factor and the downlink gain factor each satisfy a respective threshold based at least in part on a first quantity of power associated with each respective antenna of a set of antennas of the repeater device or a second quantity of power associated with of the set of antennas.

16. The repeater device of claim 11, wherein the uplink gain factor and the downlink gain factor each satisfy a respective threshold associated with a channel reciprocity.

17. The repeater device of claim 11, wherein a relationship between the uplink gain factor and the downlink gain factor is based at least in part on a product of a first value and an identity matrix.

18. The repeater device of claim 17, wherein the first value varies over time.

19. A method for wireless communications at a network entity, comprising:

obtaining, from a repeater device, an indication of an uplink gain factor associated with uplink transmissions from a user equipment (UE) via the repeater device; and outputting downlink signaling to the UE via the repeater device according to a precoding matrix associated with downlink transmissions to the UE via the repeater device, a channel rank, and a modulation and coding scheme, wherein the precoding matrix is selected according to the uplink gain factor, and wherein the channel rank and the modulation and coding scheme are selected according to the uplink gain factor, a downlink gain factor, and the precoding matrix.

20. The method of claim 19, further comprising:

obtaining one or more first sounding reference signals associated with the UE via the repeater device; and obtaining one or more second sounding reference signals associated with the repeater device, wherein the downlink gain factor is based at least in part on the one or more first sounding reference signals and the one or more second sounding reference signals.

21. The method of claim 20, further comprising:

estimating a channel quality between the network entity and the repeater device based at least in part on the one or more second sounding reference signals, wherein the downlink gain factor is further based at least in part on the estimated channel quality.

22. The method of claim 20, wherein selecting the precoding matrix is further based at least in part on the downlink gain factor.

23. The method of claim 22, wherein selecting the channel rank and the modulation and coding scheme is based at least in part on an updated downlink gain factor, the updated downlink gain factor based at least in part on the precoding matrix.

24. The method of claim 20, wherein selecting the channel rank and the modulation and coding scheme is based at least in part on an updated precoding matrix, wherein the updated precoding matrix is selected based at least in part on the downlink gain factor.

25. The method of claim 19, further comprising:

outputting one or more reference signals to the repeater device; and obtaining an indication of the downlink gain factor from the repeater device based at least in part on outputting the one or more reference signals.

26. The method of claim 25, wherein the one or more reference signals are output in accordance with the precoding matrix.

27. The method of claim 19, wherein a relationship between the uplink gain factor and the downlink gain factor is based at least in part on a product of a first value and an identity matrix.

28. A method for wireless communications at a repeater device, comprising:

outputting, to a network entity, an indication of an uplink gain factor associated with uplink transmissions from a user equipment (UE);

obtaining downlink signaling according to a channel rank and a modulation and coding scheme corresponding to the uplink gain factor and a downlink gain factor; and forwarding the downlink signaling to the UE.

29. The method of claim 28, further comprising:

forwarding, to the network entity, one or more first sounding reference signals associated with the UE; and outputting, to the network entity, one or more second sounding reference signals associated with the repeater device, wherein the downlink signaling is based at least in part on the one or more first sounding reference signals and the one or more second sounding reference signals.

30. The method of claim 28, further comprising:

obtaining one or more downlink reference signals; and outputting an indication of the downlink gain factor to the network entity, wherein the downlink gain factor is based at least in part on the one or more downlink reference signals, and wherein the downlink signaling is based at least in part on the downlink gain factor.

* * * * *